(12) United States Patent
Nash et al.

(10) Patent No.: US 11,580,654 B2
(45) Date of Patent: Feb. 14, 2023

(54) ALTERNATING LIGHT DISTRIBUTIONS FOR ACTIVE DEPTH SENSING

(71) Applicant: QUALCOMM Incorporated, San Diego, CA (US)

(72) Inventors: James Wilson Nash, San Diego, CA (US); Kalin Mitkov Atanassov, San Diego, CA (US); Ioannis Nousias, San Diego, CA (US); Mark Ian Roy Muir, San Diego, CA (US); Sami Khawam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 16/893,081

(22) Filed: Jun. 4, 2020

(65) Prior Publication Data
US 2021/0201519 A1 Jul. 1, 2021

(51) Int. Cl.
*G06T 7/521* (2017.01)
*G06V 20/13* (2022.01)
*G06V 20/64* (2022.01)

(52) U.S. Cl.
CPC ............. *G06T 7/521* (2017.01); *G06V 20/13* (2022.01); *G06V 20/64* (2022.01)

(58) Field of Classification Search
CPC .. G06T 7/521; G06K 9/00201; G06K 9/0063; G01B 11/2513; G01S 7/4808; G01S 7/484; G01S 7/486; G01S 17/10; G01S 17/46; G01S 17/89
See application file for complete search history.

(56) References Cited

U.S. PATENT DOCUMENTS

| 9,826,216 | B1 | 11/2017 | Hazeghi et al. |
| 10,306,203 | B1 * | 5/2019 | Goyal ................. H04N 13/271 |
| 2016/0050401 | A1 * | 2/2016 | Gordon ................ G01B 11/167 |
| | | | 348/744 |
| 2016/0209729 | A1 * | 7/2016 | Hudman ............... H04N 5/335 |

(Continued)

FOREIGN PATENT DOCUMENTS

EP 3407601 A1 11/2018

OTHER PUBLICATIONS

Partial International Search Report—PCT/US2020/062931—ISA/EPO—dated Mar. 12, 2021.

(Continued)

*Primary Examiner* — Nay A Maung
*Assistant Examiner* — Kathleen M Broughton
(74) *Attorney, Agent, or Firm* — Polsinelli LLP

(57) ABSTRACT

Aspects of the present disclosure relate to systems and methods for active depth sensing. An example apparatus configured to perform active depth sensing includes a projector. The projector is configured to emit a first distribution of light during a first time and emit a second distribution of light different from the first distribution of light during a second time. A set of final depth values of one or more objects in a scene is based on one or more reflections of the first distribution of light and one or more reflections of the second distribution of light. The projector may include a laser array, and the apparatus may be configured to switch between a first plurality of lasers of the laser array to emit light during the first time and a second plurality of laser to emit light during the second time.

28 Claims, 12 Drawing Sheets

(56) References Cited

U.S. PATENT DOCUMENTS

| | | | |
|---|---|---|---|
| 2016/0307326 A1* | 10/2016 | Wang | G06T 7/521 |
| 2016/0334509 A1 | 11/2016 | Gruenwald | |
| 2017/0261314 A1* | 9/2017 | Konolige | G06T 7/593 |
| 2017/0329012 A1 | 11/2017 | Buttgen et al. | |
| 2018/0048880 A1 | 2/2018 | Trail et al. | |
| 2018/0095165 A1* | 4/2018 | Cohen | G02B 19/0009 |
| 2018/0227562 A1* | 8/2018 | Bleyer | H04N 13/254 |
| 2018/0227571 A1* | 8/2018 | Page | G01B 11/2518 |
| 2018/0249143 A1* | 8/2018 | Calpe Maravilla | G01S 7/4817 |
| 2018/0321384 A1* | 11/2018 | Lindner | G01S 7/4911 |
| 2019/0156557 A1 | 5/2019 | Gordon et al. | |
| 2019/0249984 A1* | 8/2019 | Barlev | G01B 11/25 |

OTHER PUBLICATIONS

International Search Report and Written Opinion—PCT/US2020/062931—ISA/EPO—dated May 20, 2021.

\* cited by examiner

ALTERNATING LIGHT DISTRIBUTIONS FOR ACTIVE DEPTH SENSING

RELATED APPLICATION

This Patent Application claims priority to the Greek patent application number 20190100583 entitled "ALTERNATING LIGHT DISTRIBUTIONS FOR ACTIVE DEPTH SENSING" and filed on Dec. 30, 2019, in the Industrial Property Organization in Athens. The Greek patent application is assigned to the assignee hereof. The disclosure of the prior application is considered part of and is incorporated by reference in this Patent Application.

TECHNICAL FIELD

This disclosure relates generally to active depth sensing systems, and specifically to a projector alternating emissions of different distributions of light for active depth sensing.

BACKGROUND

For active depth sensing, a device may include a projector to emit a distribution of light, for which reflections of the distribution of light are sensed and measured to determine distances of objects in a scene. For example, a device may include a light projector that projects a distribution of infrared (IR) light (such as a distribution of IR light points) onto a scene. An active light receiver receives reflections of the IR light during a frame capture, and the device determines depths or distances of objects in the scene based on the received reflections.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Some aspects of the present disclosure relate to an example apparatus for active depth sensing. The apparatus includes a projector configured to emit a first distribution of light during a first time and emit a second distribution of light different from the first distribution of light during a second time. A set of final depth values (such as for a final depth map) of one or more objects in a scene is based on one or more reflections of the first distribution of light and one or more reflections of the second distribution of light.

In some implementations, the projector is further configured to emit a third distribution of light different from the first distribution of light and the second distribution of light during a third time. The set of final depth values of the one or more objects in the scene is further based on one or more reflections of the third distribution of light. In some implementations, the projector includes a laser array, and for each laser of the laser array, the laser emits light during one or more of the first time or the second time. In some implementations, for each laser of the laser array, the laser emits light during one of the first time or the second time. The projector may include a switch to switch between a first plurality of lasers of the laser array to emit light during the first time and a second plurality of lasers of the laser array to emit light during the second time.

In some implementations, the apparatus also includes an image sensor configured to receive one or more reflections of the first distribution of light during capture of a first frame associated with the first time and receive one or more reflections of the second distribution of light during capture of a second frame associated with the second time. The apparatus may also include an image signal processor configured to generate a first set of depth values based on the first frame, generate a second set of depth values based on the second frame, and combine the first set of depth values and the second set of depth values to generate the set of final depth values.

In some implementations, the projector is configured to periodically alternate between emitting the first distribution of light and emitting the second distribution of light. Each emission of the first distribution of light is associated with capture of one of a first set of frames by the image sensor, and each emission of the second distribution of light is associated with capture of one of a second set of frames by the image sensor. In some implementations, the image signal processor is configured to generate the first set of depth values based on the first set of frames and generate the second set of depth values based on the second set of frames. In some implementations, the first set of depth values is included in a first depth map, and the second set of depth values is included in a second depth map. A first position in the first depth map of a first depth value from the first set of depth values corresponds to a second position in the second depth map of a second depth value from the second set of depth values. Generating the set of final depth values includes determining whether the first depth value is a valid depth value, determining whether the second depth value is a valid depth value, and based on only one of the first depth value or the second depth value being determined to be a valid depth value, setting a final depth value of the set of final depth values as the valid depth value. For example, the first set of depth values is included in a first depth map of size P×Q, and each position p×q in the first depth map includes a depth value from the first set of depth values. The second set of depth values may be included in a second depth map of size P×Q, and each position p×q in the second depth map includes a depth value from the second set of depth values and corresponds to the position p×q in the first depth map. In some implementations, generating the set of final depth values includes generating a final depth map of size P×Q, which includes, for each position p×q of the final depth map, determining whether the depth value from position p×q in the first depth map is a valid depth value, determining whether the depth value from position p×q in the second depth map is a valid depth value, and, based on only one of the depth values being determined to be a valid depth value, setting a final depth value at position p×q in the final depth map as the valid depth value.

In some implementations, generating the set of final depth values further includes, based on both of the first depth values and the second depth value being determined to be a valid depth value, setting the final depth value as one of the first depth value, the second depth value, or an average of the first depth value and the second depth value. For example, generating the final depth map of size P×Q further includes, based on both of the depth values being determined to be a valid depth value, setting the final depth value at position p×q in the final depth map as one of the valid depth value in the first depth map, the valid depth value in the second depth map, or an average of the valid depth value in the first depth map and the valid depth value in the second depth map.

In some implementations, the apparatus also includes a processor configured to provide instructions to the image signal processor for execution, a memory configured to store the final depth map, and a display configured to display the final depth map.

In some implementations, the projector is configured to alternate between emitting the first distribution of light and emitting the second distribution of light. The first distribution of light is a primal distribution of light, the second distribution of light is a dual distribution of light, and the primal distribution of light and the dual distribution of light are designed with reference to each other to permit complementary decoding of a same portion of frame captures of an image sensor to codewords from the primal distribution of light and from the dual distribution of light.

In some implementations, the first distribution of light and the second distribution of light are determined in one or more spatial dimensions, a time dimension, and an array dimension based on one or more dimension parameters.

Some further aspects of the present disclosure relate to a method for active depth sensing. An example method includes emitting, by a projector, a first distribution of light during a first time. The method also includes emitting, by the projector, a second distribution of light different from the first distribution of light during a second time. A set of final depth values (such as for a final depth map) of one or more objects in a scene is based on one or more reflections of the first distribution of light and one or more reflections of the second distribution of light.

In some implementations, the method also includes emitting, by the projector, a third distribution of light different from the first distribution of light and the second distribution of light during a third time. The set of final depth values of the one or more objects in the scene is further based on one or more reflections of the third distribution of light. In some implementations, the method also includes emitting, by each laser of a laser array of the projector, light during one or more of the first time or the second time. In some implementations, the method also includes emitting, by each laser of the laser array, light during one of the first time or the second time. In some implementations, the method also includes switching between a first plurality of lasers of the laser array to emit light during the first time and a second plurality of lasers of the laser array to emit light during the second time.

In some implementations, the method also includes receiving, by an image sensor, one or more reflections of the first distribution of light during capture of a first frame associated with the first time, receiving, by the image sensor, one or more reflections of the second distribution of light during capture of a second frame associated with the second time, generating, by an image signal processor, a first set of depth values based on the first frame, generating, by the image signal processor, a second set of depth values based on the second frame, and combining the first set of depth values and the second set of depth values to generate the set of final depth values.

In some implementations, the method also includes periodically alternating between emitting the first distribution of light and emitting the second distribution of light. Each emission of the first distribution of light is associated with capture of one of a first set of frames by the image sensor, and each emission of the second distribution of light is associated with capture of one of a second set of frames by the image sensor. The method may also include generating the first set of depth values based on the first set of frames and generating the second set of depth values based on the second set of frames.

In some implementations, the first set of depth values is included in a first depth map, and the second set of depth values is included in a second depth map. A first position in the first depth map of a first depth value from the first set of depth values corresponds to a second position in the second depth map of a second depth value from the second set of depth values. Generating the set of final depth values includes determining whether the first depth value is a valid depth value, determining whether the second depth value is a valid depth value, and based on only one of the first depth value or the second depth value being determined to be a valid depth value, setting a final depth value of the set of final depth values as the valid depth value. For example, the first set of depth values is included in a first depth map of size P×Q, and each position p×q in the first depth map includes a depth value from the first set of depth values. The second set of depth values may be included in a second depth map of size P×Q, and each position p×q in the second depth map includes a depth value from the second set of depth values and corresponds to the position p×q in the first depth map. In some implementations, generating the set of final depth values includes generating a final depth map of size P×Q, which includes, for each position p×q of the final depth map, determining whether the depth value from position p×q in the first depth map is a valid depth value, determining whether the depth value from position p×q in the second depth map is a valid depth value, and, based on only one of the depth values being determined to be a valid depth value, setting a final depth value at position p×q in the final depth map as the valid depth value.

In some implementations, generating the set of final depth values further includes, based on both of the first depth values and the second depth value being determined to be a valid depth value, setting the final depth value as one of the first depth value, the second depth value, or an average of the first depth value and the second depth value. For example, generating the final depth map of size P×Q further includes, based on both of the depth values being determined to be a valid depth value, setting the final depth value at position p×q in the final depth map as one of the valid depth value in the first depth map, the valid depth value in the second depth map, or an average of the valid depth value in the first depth map and the valid depth value in the second depth map.

In some implementations, the projector is configured to alternate between emitting the first distribution of light and emitting the second distribution of light. The first distribution of light is a primal distribution of light, the second distribution of light is a dual distribution of light, and the primal distribution of light and the dual distribution of light are designed with reference to each other to permit complementary decoding of a same portion of frame captures of an image sensor to codewords from the primal distribution of light and from the dual distribution of light.

In some implementations, the first distribution of light and the second distribution of light are determined in one or more spatial dimensions, a time dimension, and an array dimension based on one or more dimension parameters.

Some other aspects of the present disclosure relate to an example computer-readable medium. The computer-readable medium stores instructions that, when executed by a processor of a device performing active depth sensing, cause the device to emit, by a projector, a first distribution of light during a first time. Execution of the instructions also causes the device to emit, by the projector, a second distribution of light different from the first distribution of light during a second time. A set of final depth values (such as for a final depth map) of one or more objects in a scene is based on one or more reflections of the first distribution of light and one or more reflections of the second distribution of light.

In some implementations, execution of the instructions further causes the device to emit, by the projector, a third distribution of light different from the first distribution of light and the second distribution of light during a third time. The set of final depth values of the one or more objects in the scene is further based on one or more reflections of the third distribution of light. In some implementations, execution of the instructions further causes the device to switch between a first plurality of lasers of a laser array of the projector to emit light during the first time and a second plurality of lasers of the laser array to emit light during the second time.

In some implementations, execution of the instructions further causes the device to receive, by an image sensor, one or more reflections of the first distribution of light during capture of a first frame associated with the first time, receive, by the image sensor, one or more reflections of the second distribution of light during capture of a second frame associated with the second time, generate, by an image signal processor, a first set of depth values based on the first frame, generate, by the image signal processor, a second set of depth values based on the second frame, and combine the first set of depth values and the second set of depth values to generate the set of final depth values.

In some implementations, execution of the instructions further causes the device to periodically alternate between emitting the first distribution of light and emitting the second distribution of light. Each emission of the first distribution of light is associated with capture of one of a first set of frames by the image sensor. Each emission of the second distribution of light is associated with capture of one of a second set of frames by the image sensor. Execution of the instructions may further cause the device to generate the first set of depth values based on the first set of frames and generate the second set of depth values based on the second set of frames.

In some implementations, the first set of depth values is included in a first depth map, and the second set of depth values is included in a second depth map. A first position in the first depth map of a first depth value from the first set of depth values corresponds to a second position in the second depth map of a second depth value from the second set of depth values. Generating the set of final depth values includes determining whether the first depth value is a valid depth value, determining whether the second depth value is a valid depth value, and based on only one of the first depth value or the second depth value being determined to be a valid depth value, setting a final depth value of the set of final depth values as the valid depth value. For example, the first set of depth values is included in a first depth map of size P×Q, and each position p×q in the first depth map includes a depth value from the first set of depth values. The second set of depth values may be included in a second depth map of size P×Q, and each position p×q in the second depth map includes a depth value from the second set of depth values and corresponds to the position p×q in the first depth map. In some implementations, generating the set of final depth values includes generating a final depth map of size P×Q, which includes, for each position p×q of the final depth map, determining whether the depth value from position p×q in the first depth map is a valid depth value, determining whether the depth value from position p×q in the second depth map is a valid depth value, and, based on only one of the depth values being determined to be a valid depth value, setting a final depth value at position p×q in the final depth map as the valid depth value.

In some implementations, generating the set of final depth values further includes, based on both of the first depth values and the second depth value being determined to be a valid depth value, setting the final depth value as one of the first depth value, the second depth value, or an average of the first depth value and the second depth value. For example, generating the final depth map of size P×Q further includes, based on both of the depth values being determined to be a valid depth value, setting the final depth value at position p×q in the final depth map as one of the valid depth value in the first depth map, the valid depth value in the second depth map, or an average of the valid depth value in the first depth map and the valid depth value in the second depth map.

In some implementations, execution of the instructions further causes the device to alternate, by the projector, between emitting the first distribution of light and emitting the second distribution of light. The first distribution of light is a primal distribution of light, the second distribution of light is a dual distribution of light, and the primal distribution of light and the dual distribution of light are designed with reference to each other to permit complementary decoding of a same portion of frame captures of an image sensor to codewords from the primal distribution of light and from the dual distribution of light.

In some implementations, the first distribution of light and the second distribution of light are determined in one or more spatial dimensions, a time dimension, and an array dimension based on one or more dimension parameters.

Some further aspects of the present disclosure relate to an example device for performing active depth sensing. The device includes means for emitting a first distribution of light during a first time. The device also includes means for emitting a second distribution of light different from the first distribution of light during a second time. A set of final depth values (such as for a final depth map) of one or more objects in a scene is based on one or more reflections of the first distribution of light and one or more reflections of the second distribution of light.

In some implementations, the device also includes means for emitting a third distribution of light different from the first distribution of light and the second distribution of light during a third time. The set of final depth values of the one or more objects in the scene is further based on one or more reflections of the third distribution of light. In some implementations, the device also includes means for switching between a first plurality of lasers of a laser array to emit light during the first time and a second plurality of lasers of the laser array to emit light during the second time. In some implementations, the device also includes means for receiving one or more reflections of the first distribution of light during capture of a first frame associated with the first time, means for receiving one or more reflections of the second distribution of light during capture of a second frame associated with the second time, means for generating a first set of depth values based on the first frame, means for generating a second set of depth values based on the second frame, and means for combining the first set of depth values and the second set of depth values to generate the set of final depth values.

In some implementations, the first set of depth values is included in a first depth map, and the second set of depth values is included in a second depth map. A first position in the first depth map of a first depth value from the first set of depth values corresponds to a second position in the second depth map of a second depth value from the second set of depth values. Generating the set of final depth values includes determining whether the first depth value is a valid depth value, determining whether the second depth value is a valid depth value, and based on only one of the first depth value or the second depth value being determined to be a valid depth value, setting a final depth value of the set of final depth values as the valid depth value. For example, the first set of depth values is included in a first depth map of size P×Q, and each position p×q in the first depth map includes a depth value from the first set of depth values. The second set of depth values may be included in a second depth map of size P×Q, and each position p×q in the second depth map includes a depth value from the second set of depth values and corresponds to the position p×q in the first depth map. In some implementations, generating the set of final depth values includes generating a final depth map of size P×Q, which includes, for each position p×q of the final depth map, determining whether the depth value from position p×q in the first depth map is a valid depth value, determining whether the depth value from position p×q in the second depth map is a valid depth value, and, based on only one of the depth values being determined to be a valid depth value, setting a final depth value at position p×q in the final depth map as the valid depth value.

In some implementations, generating the set of final depth values further includes, based on both of the first depth values and the second depth value being determined to be a valid depth value, setting the final depth value as one of the first depth value, the second depth value, or an average of the first depth value and the second depth value. For example, generating the final depth map of size P×Q further includes, based on both of the depth values being determined to be a valid depth value, setting the final depth value at position p×q in the final depth map as one of the valid depth value in the first depth map, the valid depth value in the second depth map, or an average of the valid depth value in the first depth map and the valid depth value in the second depth map.

In some implementations, the device also includes means for periodically alternating between emitting the first distribution of light and emitting the second distribution of light. Each emission of the first distribution of light is associated with capture of one of a first set of frames, and each emission of the second distribution of light is associated with capture of one of a second set of frames. The device may also include means for generating the first set of depth values based on the first set of frames and means for generating the second set of depth values based on the second set of frames.

The device may be configured to alternate between emitting the first distribution of light and emitting the second distribution of light. The first distribution of light is a primal distribution of light. The second distribution of light is a dual distribution of light. The primal distribution of light and the dual distribution of light are designed with reference to each other to permit complementary decoding of a same portion of frame captures of an image sensor to codewords from the primal distribution of light and from the dual distribution of light.

In some implementations, the first distribution of light and the second distribution of light are determined in one or more spatial dimensions, a time dimension, and an array dimension based on one or more dimension parameters.

BRIEF DESCRIPTION OF THE DRAWINGS

Aspects of the present disclosure are illustrated by way of example, and not by way of limitation, in the figures of the accompanying drawings and in which like reference numerals refer to similar elements.

DETAILED DESCRIPTION

Aspects of the present disclosure relate to active depth sensing, including a projector configured to switch between emitting different distributions of light for active depth sensing.

Some implementations of active depth sensing systems include structured light depth sensing. As used herein, structured light depth sensing refers to active depth sensing for which a projector transmits multiple instances of focused light in a predefined distribution. As used herein, a distribution of light may include a distribution of points of light, arcs of light, or another suitable shape of each focused light instance. The distribution being defined means that the location of each light instance within the distribution is known by the device before emission. The present disclosure refers to a distribution of light as a distribution of light points to illustrate aspects of the disclosure, but any suitable shape of the light instances and any suitable distribution of the light instances may be used.

The points of light may be projected on to a scene, and the reflections of the points of light (along with other light from the scene) may be received by a receiver of the active depth sensing system. Depths of objects in a scene may be determined by comparing the pattern of the received light and the pattern of the transmitted light. In comparing the patterns, a portion of the predefined distribution of the transmitted light may be identified in the received light. The locations of the portions and any skew or stretching of the portions of the distribution identified in the received light are then used to determine depths of one or more objects in the scene.

Figure 1:
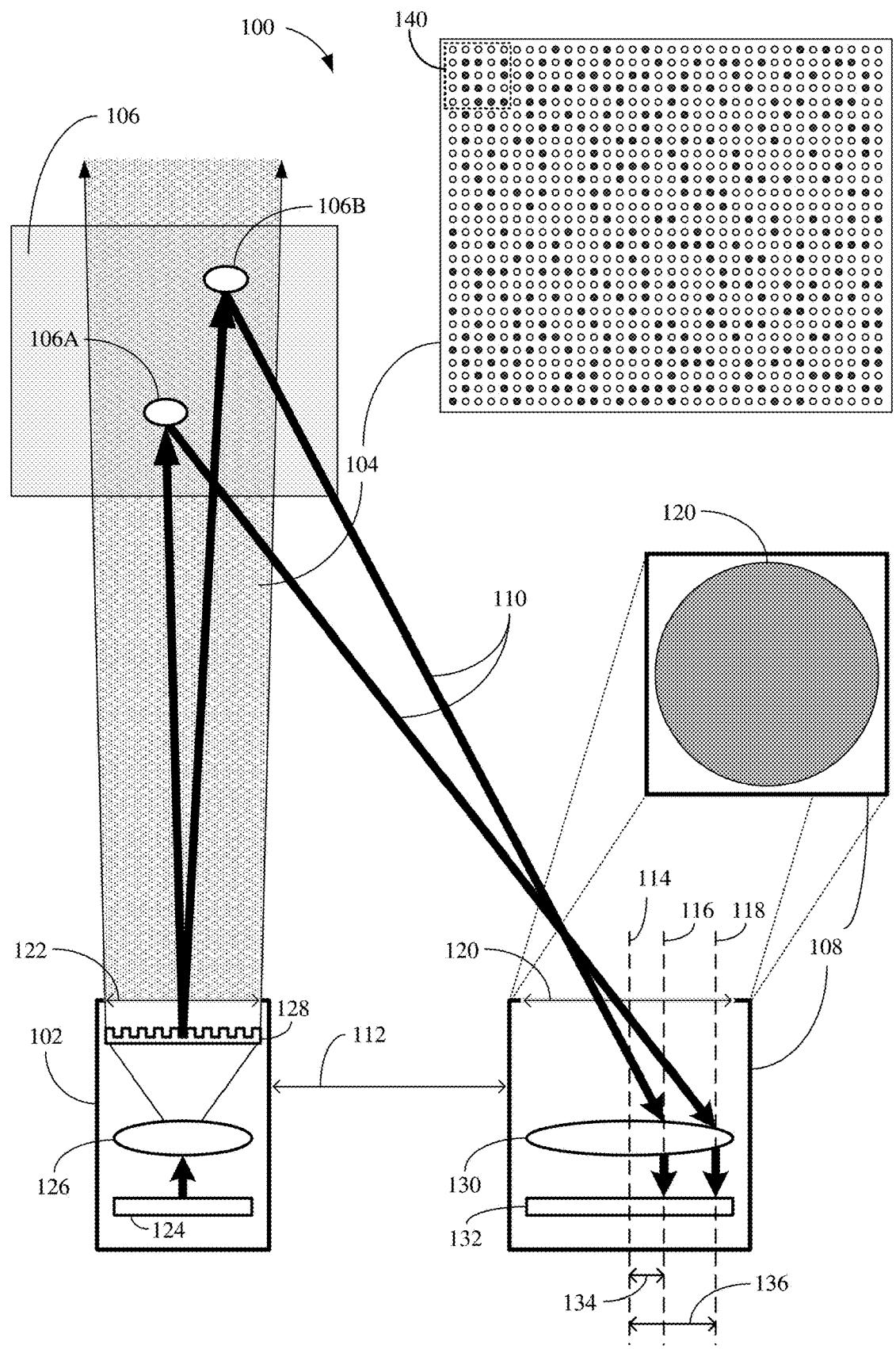
FIG. 1 is a depiction of an example active depth sensing system including a projector for emitting a distribution of light.

FIG. 1 is a depiction of an example active depth sensing system 100 configured to use a distribution of light for determining depths of objects 106A and 106B in the scene 106. The active depth sensing system 100 may be used to generate a set of depth values (such as for a depth map (not pictured)) of a scene 106. For example, the scene 106 may include a face, and the active depth sensing system 100 may be used to generate a set of depth values (such as a depth map including a plurality of depth values) indicating depths of portions of the face for identifying or authenticating the face. A used herein, generating a depth map may refer to generating a set of depth values. The active depth sensing system 100 may include a projector 102 and a receiver 108. The projector 102 may be referred to as a "transmitter," "projector," "emitter," "light source," and so on, and should not be limited to a specific transmission component. Throughout the following disclosure, the terms projector, transmitter, and light source may be used interchangeably. The receiver 108 may be referred to as a "detector," "sensor," "sensing element," "photodetector," and so on, and should not be limited to a specific receiving component.

The projector 102 may be configured to project or transmit a distribution 104 of light points onto the scene 106. The white circles in the distribution 104 may indicate where no light is projected for a possible point location, and the black circles in the distribution 104 may indicate where light is projected for a possible point location. The disclosure may refer to the distribution 104 as a codeword distribution, where defined portions of the distribution 104 are codewords. As used herein, a codeword is a rectangular (such as a square) portion of the distribution of light. For example, a 5×5 codeword 140 is illustrated in the distribution 104. As shown, the 5×5 codeword 140 includes five rows of possible light points and five columns of possible light points. The distribution 104 may be configured to include an array of codewords. For active depth sensing, the codewords may be unique from one another in the distribution 104. For example, codeword 140 is different than all other codewords in the distribution 104. Further, the location of unique codewords with reference to one another is known. In this manner, one or more codewords in the distribution may be identified in reflections, and the location of the identified codewords with reference to one another, the shape or distortion of the identified codewords with reference to the shape of the transmitted codeword, and the location of the identified codeword on a receiver sensor are used to determine a depth of an object in the scene reflecting the codeword.

The projector 102 may include one or more light sources 124 (such as one or more lasers). In some implementations, the one or more light sources 124 includes a laser array. Each laser may be a vertical cavity surface emitting laser (VCSEL) or other suitable laser. In some implementations, the projector may also include a lens 126 and a light modulator 128. The projector 102 may also include an aperture 122 from which the transmitted light escapes the projector 102. In some implementations, the projector 102 may further include a diffractive optical element (DOE) to diffract the emissions from one or more light sources 124 into additional emissions. In some aspects, the light modulator 128 (to adjust the intensity of the emission) may include a DOE. In projecting the distribution 104 of light points onto the scene 106, the projector 102 may transmit one or more lasers from the light source 124 through the lens 126 (and/or through a DOE or light modulator 128) and onto objects 106A and 106B in the scene 106. The projector 102 may be positioned on the same reference plane as the receiver 108, and the projector 102 and the receiver 108 may be separated by a distance called the baseline (112).

In some example implementations, the light projected by the projector 102 may be infrared (IR) light. IR light may include portions of the visible light spectrum and/or portions of the light spectrum that is not visible to the naked eye. In one example, IR light may include near infrared (NIR) light, which may or may not include light within the visible light spectrum, and/or IR light (such as far infrared (FIR) light) which is outside the visible light spectrum. The term IR light should not be limited to light having a specific wavelength in or near the wavelength range of IR light. Further, IR light is provided as an example emission from the projector. In the following description, other suitable wavelengths of light may be used. For example, light in portions of the visible light spectrum outside the IR light wavelength range or ultraviolet light may be used.

The scene 106 may include objects at different depths from the structured light system (such as from the projector 102 and the receiver 108). For example, objects 106A and 106B in the scene 106 may be at different depths. The receiver 108 may be configured to receive, from the scene 106, reflections 110 of the transmitted distribution 104 of light points. To receive the reflections 110, the receiver 108 may capture a frame. When capturing the frame, the receiver 108 may receive the reflections 110, as well as (i) other reflections of the distribution 104 of light points from other portions of the scene 106 at different depths and (ii) ambient light. Noise may also exist in the capture.

In some example implementations, the receiver 108 may include a lens 130 to focus or direct the received light (including the reflections 110 from the objects 106A and 106B) on to the sensor 132 of the receiver 108. The receiver 108 also may include an aperture 120. Assuming for the example that only the reflections 110 are received, depths of the objects 106A and 106B may be determined based on the baseline 112, displacement and distortion of the light distribution 104 (such as in codewords) in the reflections 110, and intensities of the reflections 110. For example, the distance 134 along the sensor 132 from location 116 to the center 114 may be used in determining a depth of the object 106B in the scene 106. Similarly, the distance 136 along the sensor 132 from location 118 to the center 114 may be used in determining a depth of the object 106A in the scene 106. The distance along the sensor 132 may be measured in terms of number of pixels of the sensor 132 or a unit of distance (such as millimeters).

In some example implementations, the sensor 132 may include an array of photodiodes (such as avalanche photodiodes) for capturing a frame. To capture the frame, each photodiode in the array may capture the light that hits the photodiode and may provide a value indicating the intensity of the light (a capture value). The frame therefore may be an array of capture values provided by the array of photodiodes.

In addition or alternative to the sensor 132 including an array of photodiodes, the sensor 132 may include a complementary metal-oxide semiconductor (CMOS) sensor. To capture the image by a photosensitive CMOS sensor, each pixel of the sensor may capture the light that hits the pixel and may provide a value indicating the intensity of the light. In some example implementations, an array of photodiodes may be coupled to the CMOS sensor. In this manner, the electrical impulses generated by the array of photodiodes may trigger the corresponding pixels of the CMOS sensor to provide capture values.

The sensor 132 may include at least a number of pixels equal to the number of possible light points in the distribution 104. For example, the array of photodiodes or the CMOS sensor may include at least a number of photodiodes or a number of pixels, respectively, corresponding to the number of possible light points in the distribution 104. The sensor 132 logically may be divided into groups of pixels or photodiodes that correspond to a size of a bit of a codeword (such as 4×4 groups for a 4×4 codeword). The group of pixels or photodiodes also may be referred to as a bit, and the portion of the captured data from a bit of the sensor 132 also may be referred to as a bit. In some example implementations, the sensor 132 may include at least the same number of bits as the distribution 104. If the light source 124 transmits IR light (such as NIR light at a wavelength of, e.g., 940 nm), the sensor 132 may be an IR sensor to receive the reflections of the NIR light.

As illustrated, the distance 134 (corresponding to the reflections 110 from the object 106B) is less than the distance 136 (corresponding to the reflections 110 from the object 106A). Using triangulation based on the baseline 112 and the distances 134 and 136, the differing depths of objects 106A and 106B in the scene 106 may be determined in generating a depth map of the scene 106. Determining the depths may further be based on a displacement or a distortion of the distribution 104 in the reflections 110.

Although a number of separate components are illustrated in FIG. 1, one or more of the components may be implemented together or include additional functionality. All described components may not be required for an active depth sensing system 100, or the functionality of components may be separated into separate components. Additional components not illustrated also may exist. For example, the receiver 108 may include a bandpass filter to allow signals having a determined range of wavelengths to pass onto the sensor 132 (thus filtering out signals with a wavelength outside of the range). In this manner, some incidental signals (such as ambient light) may be prevented from being received as interference during the captures by the sensor 132. The range of the bandpass filter may be centered at the transmission wavelength for the projector 102. For example, if the projector 102 is configured to transmit NIR light with a wavelength of 940 nm, the receiver 108 may include a bandpass filter configured to allow NIR light having wavelengths within a range of, e.g., 920 nm to 960 nm. Therefore, the examples described regarding FIG. 1 is for illustrative purposes.

For conventional active depth sensing systems using a light distribution, the light distribution is fixed. Therefore, the same distribution of light is used in every instance for active depth sensing. However, some codewords in the distribution may be difficult to identify in the reflections received at the receiver. As a result, a depth value may not be determined for a portion of a scene reflecting the unidentified codeword of the distribution of light.

For example, when an array of light points (such as the distribution 104) reflect off surfaces of objects in a scene, the angle of reflection may cause multiple light points to be received at a same location of an image sensor (such as sensor 132). If the waves of the light points received at the same location are out of phase, the intensities of the light points may cancel one another such that the image sensor's capture may not perceive the received light points. Conversely, if the waves are in phase, the intensities may be amplified, and the captures at one or more image sensor pixels may be saturated as a result of their amplified intensities. Such interference may be referred to as speckle interference, which is based on the scatter of the light by surfaces in the scene. Light points of a codeword may not be identified as a result of speckle interference, and the active depth sensing system may be unable to identify the codeword missing one or more light points in the reflections. As a result, a depth map including speckle interference in an image sensor's capture may not include a valid depth value for the location of the unidentified codeword (which may be illustrated as black shading in an illustrated depth map).

An active depth sensing system 100 may use larger codewords to overcome being unable to identify one or more codewords. For example, instead of 4×4 codewords being used (and a portion of the codewords being unidentified in the captures by the receiver), the active depth sensing system may use a 5×5 codeword or larger. Increasing the size of the codewords increases the number of light points per codeword, and the additional light points may assist the active depth sensing system 100 to identify the codeword in the captures. However, as codewords increase in size, the resolution of the depth map decreases in resolution. For example, one depth value may be determined for one codeword identified in a capture. If the codewords increase in size from 4×4 to 5×5, the number of codewords in the distribution decreases by $16/25$. As a result, a depth map's resolution when using 5×5 codewords may be almost half of a depth map's resolution when using 4×4 codewords.

Alternative to using different size codewords, the active depth sensing system 100 may be configured to emit a sparser distribution of light. As used herein, a sparser distribution of light means the number of light points is less for a defined area of a first distribution of light than for a second distribution light. For example, the space between light points may be greater for a first distribution of light than for a second distribution of light. Increasing the spacing between light points may increase the ability of the active depth sensing system to identify each specific light point in one or more reflections of the distribution of light in captures. Similar to problems with increasing the size of codewords of a distribution of light, though, using a sparser distribution of light results in a lower resolution depth map than if using a denser distribution of light.

Additionally, when the distribution of light is fixed, some portions of the distribution do not include light points. For example, the distribution of light 104 includes places where no light instance exists. Since gaps exist between light points, a scene may be unevenly illuminated by the distribution of light 104. Uneven lighting of a scene may also create difficulties in generating depth values for generating a depth map.

Figure 2A:
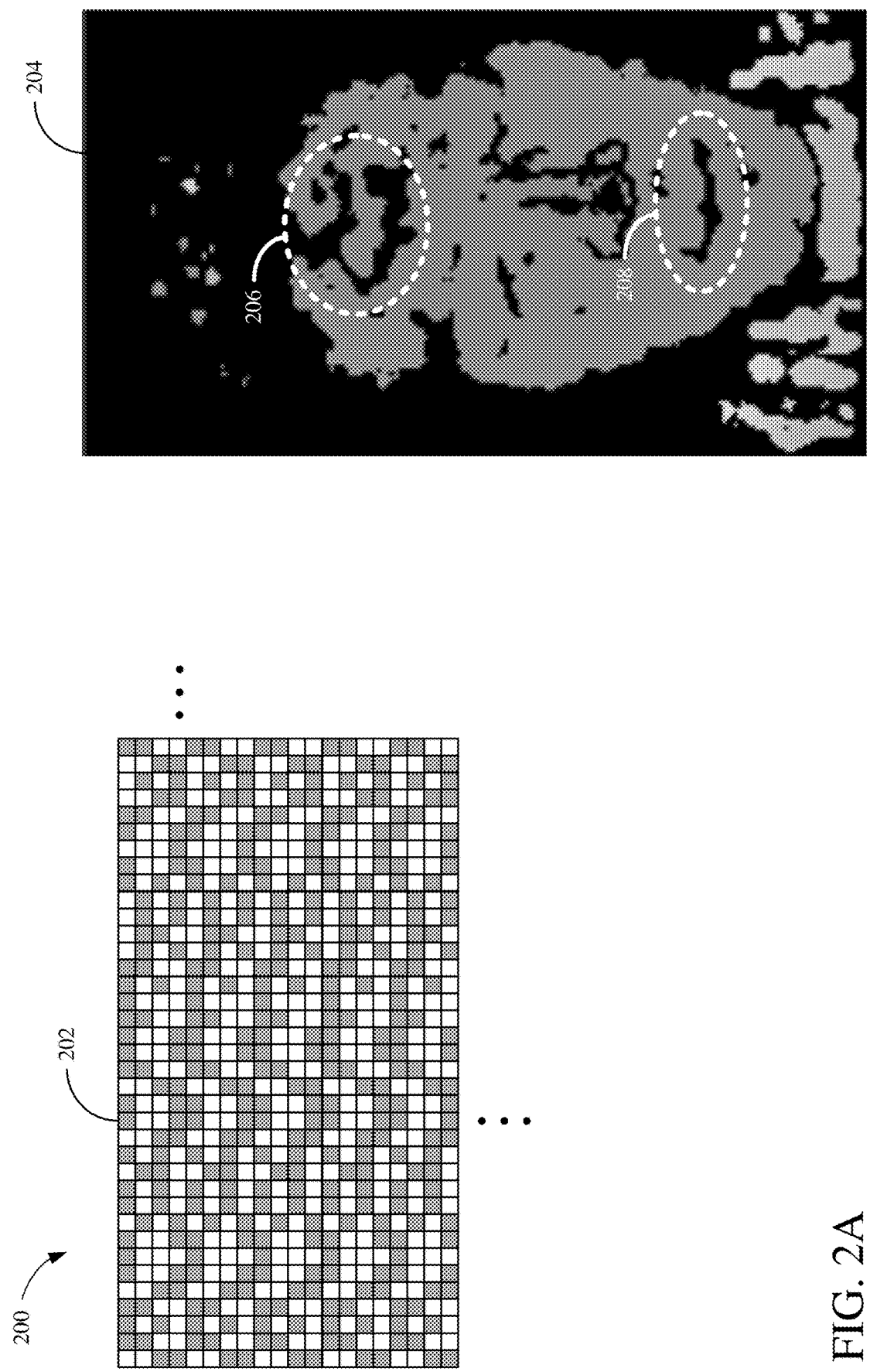
FIG. 2A is a depiction of an example depth map generated based on a distribution of light projected by an active depth sensing system's projector.

FIG. 2A is a depiction 200 of a depth map 204 generated based on a distribution of light 202 projected by an active depth sensing system's projector. The black portions of the depth map 204 indicate invalid depth values (i.e., depth values that cannot be determined by the active depth sensing system). The portions of the scene outside of the face and bust pictured in the depth map 204 may be outside of the sensing range of the active depth sensing system. However, portions of the face within the sensing range are also associated with invalid depth values. For example, portions 206 and 208 of the depth map 204 include black portions indicating invalid depth values. The invalid depth values in portions 206 and 208 may be a result of the active depth sensing system not being able to identify codewords of the distribution 202 in the one or more reflections used to generate the depth map.

Using a different distribution of light than distribution 202 for active depth sensing may still cause portions of the depth map to include invalid depth values. For example, a complementary distribution of light to distribution 202 may still be associated with invalid depth values in resulting depth maps based on the complementary distribution. As used herein, a complementary distribution of light is an inverse of the base distribution of light. For example, for the distribution of light 202, each square indicates a sector of the distribution that may include a light point. The dark squares indicate a sector not including a light point, and the light squares indicate a sector including a light point. In some implementations, the distribution of light 202 is emitted by a laser array, and each square in the distribution 202 may be associated with a laser of the laser array. A dark square may indicate a laser not emitting a light point, and a light square may indicate a laser emitting a light point in generating the distribution of light 202. In some implementations, a complementary distribution of light may refer to a distribution of light where the lasers of the laser array not emitting for the base distribution emit for the complementary distribution, and the lasers of the laser array emitting for the base distribution do not emit for the complementary distribution.

Figure 2B:
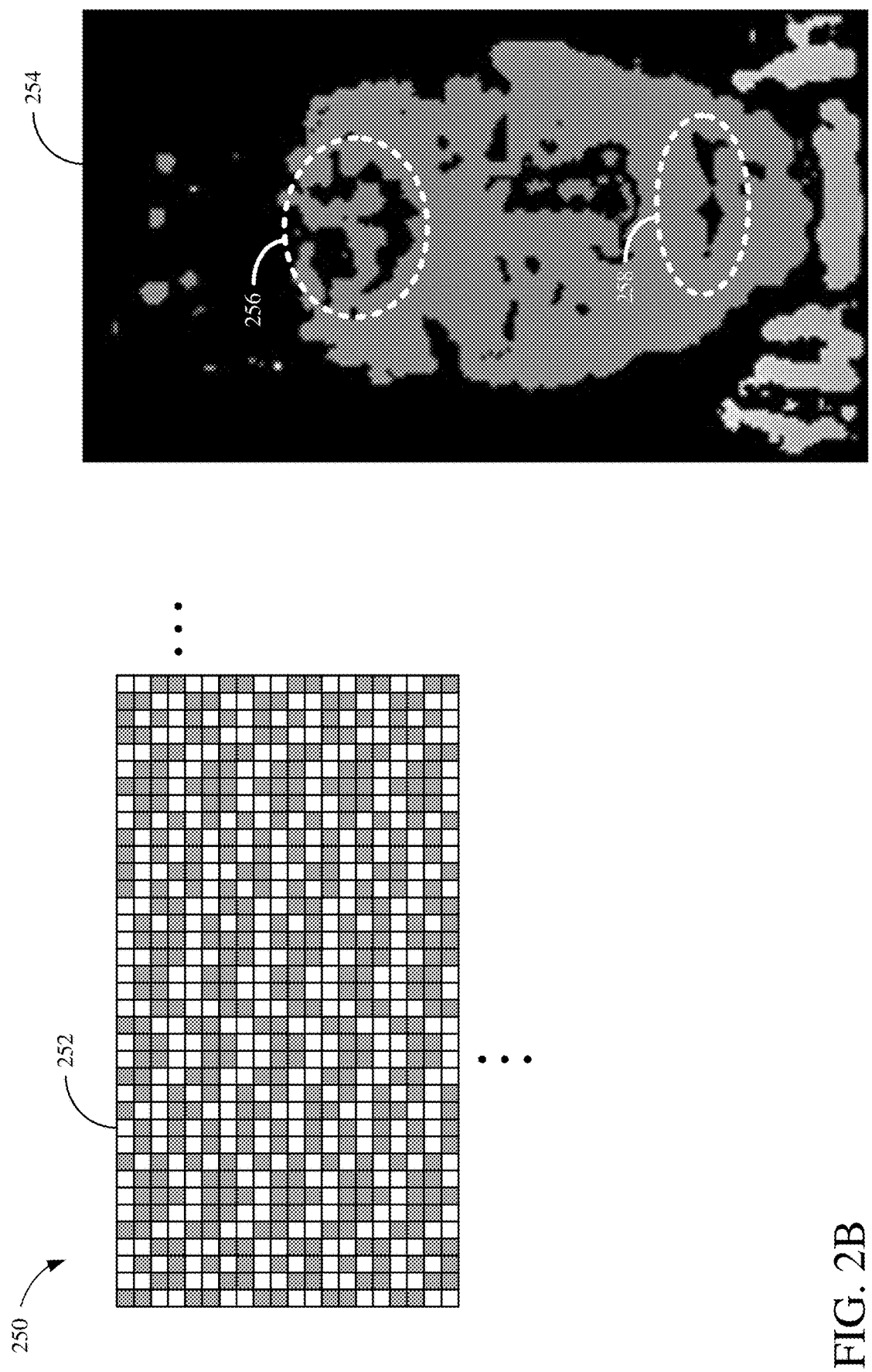
FIG. 2B is a depiction of an example depth map generated based on a different distribution of light projected by an active depth sensing system's projector.

FIG. 2B is a depiction 250 of a depth map 254 generated based on a distribution of light 252 projected by an active depth sensing system's projector. The distribution 252 is a complementary distribution to the distribution 202 in FIG. 2A. The depth map 254 generated using the distribution 252 still includes black portions that indicate invalid depth values. As shown, portions 256 and 258 of the depth map 254 corresponding to portions 206 and 208 of the depth map 204 include black portions indicating invalid depth values (with the black portions in different locations within corresponding portions 206 and 256 and corresponding portions 208 and 258).

In some aspects, a final depth map is generated based on multiple distributions of light. In some implementations, the projector 102 is configured to project a different distribution of light at different times. For example, the projector 102 may be configured to project a first distribution of light at a first time and project a second distribution of light at a second time. A resulting depth map of one or more objects in a scene is thus based on one or more reflections of the first distribution of light and one or more reflections of the second distribution of light. The codewords between the distributions of light may differ, and the active depth sensing system 100 may be able to identify a codeword in the second distribution of light corresponding to a position in the first distribution of light for which the codeword could not be identified. In some implementations, differing codewords for the different light distributions may refer to one or more of different size codewords, complementary light distributions, or differing emission times for each distribution. In this manner, more valid depth values may be generated in generating the depth map without reducing the resolution of the depth map (such as by increasing the size of the codewords).

Referring back to FIG. 1, the projector 102 may include any suitable light source 124. In some implementations, the light source 124 may include one or more vertical-cavity surface-emitting lasers (VCSELs). In some other implementations, the light source 124 may include one or more distributed feedback (DFB) lasers or other suitable lasers. The lasers may be arranged in a laser array configured to emit the distribution of light 104 as a first distribution of light and emit one or more other distributions of light of the same resolution as the distribution of light 104.

In some implementations, one or more lasers may be coupled to a DOE, and the light emitted from a laser is received and directed by the associated DOE. A coupled DOE is a material situated in the projection path of the light from the light source. The DOE may be configured to split a light point into multiple light points. For example, the material of the DOE may be a translucent or a transparent polymer with a known refractive index. The surface of the DOE may include peaks and valleys (varying the depth of the DOE) so that a light point splits into multiple light points when the light passes through the DOE. For example, the DOE may be configured to receive one or more lights points from one or more lasers and project an intended distribution with a greater number of light points than emitted by the one or more lasers.

If the light source 124 includes a laser array (such as a VCSEL array), at least a portion of the distribution of light points may be projected by the array without a DOE. The present disclosure describes a laser array being configured to emit a distribution of light without use of a DOE. However, any suitable configuration of the light source 124 or other means for emitting the distributions of light by the projector 102 may be used to perform aspects of the present disclosure.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processes, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Figure 3:
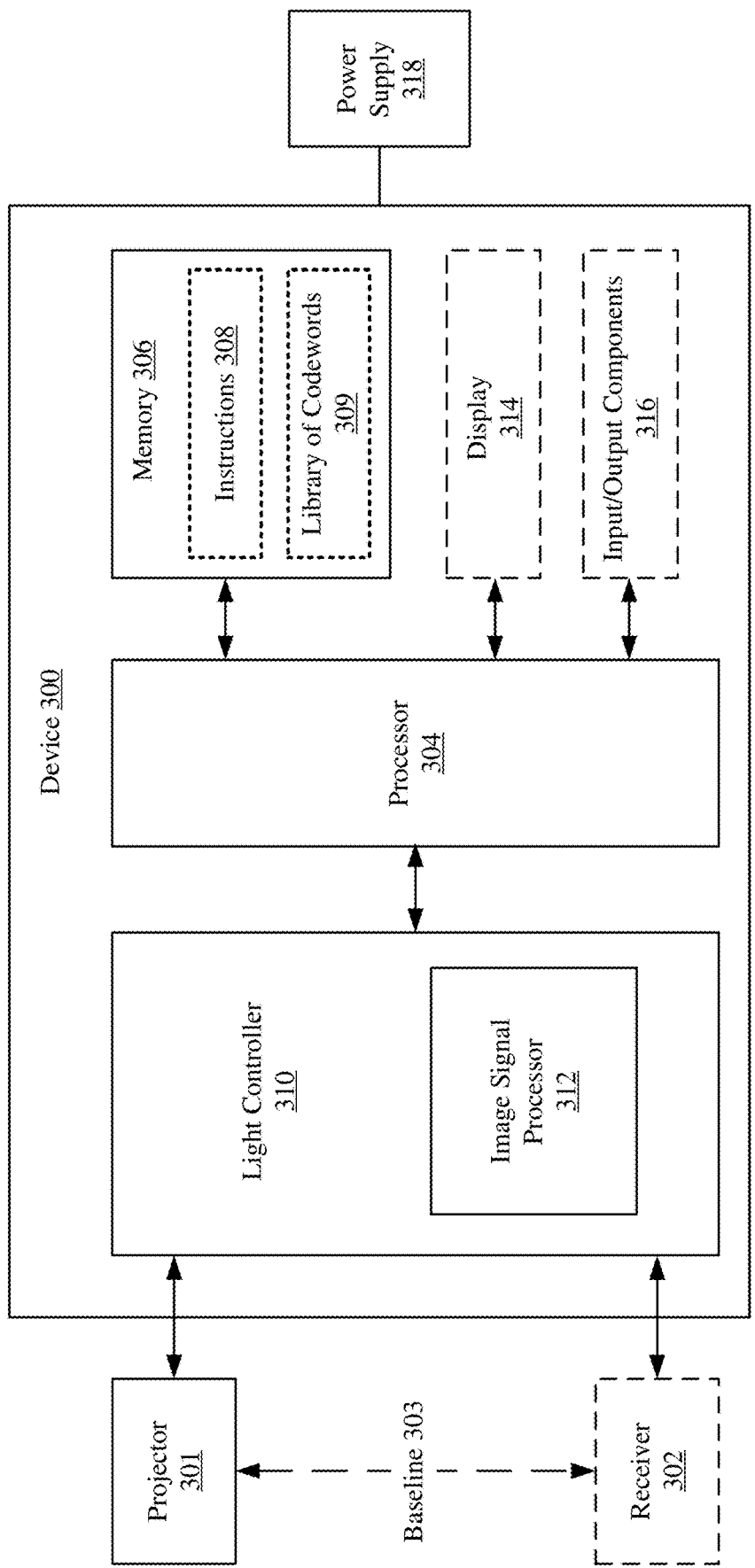
FIG. 3 is a block diagram of an example device including a projector configured to emit different distributions of light for active depth sensing.

FIG. 3 is a block diagram of an example device 300 including a projector 301 configured to emit different distributions of light for active depth sensing. In some other examples, a transmitter may be separate from and coupled to the device 300. The example device 300 may include or be coupled to a projector 301 and a receiver 302 separated from the projector 301 by a baseline 303. The receiver 302 may be an IR sensor configured to capture frames, and the projector 301 may be a projector configured to project two or more different distributions of light.

The example device 300 also may include a processor 304, a memory 306 storing instructions 308, and a light controller 310 (which may include one or more image signal processors 312). The device 300 may optionally include (or be coupled to) a display 314 and a number of input/output (I/O) components 316. The device 300 also may include a power supply 318, which may be coupled to or integrated into the device 300. The device 300 may include additional features or components not shown. For example, a wireless interface, which may include a number of transceivers and a baseband processor, may be included for a wireless communication device to perform wireless communications. In another example, the device 300 may include one or more cameras (such as a contact image sensor (CIS) camera or other suitable camera for capturing images using visible light). The projector 301 and the receiver 302 may be part of an active depth sensing system (such as the system 100 in FIG. 1) controlled by the light controller 310 and/or the processor 304. The device 300 may include or be coupled to additional light projectors (or a flood illuminator) or may include a different configuration for the light projectors. The device 300 also may include or be coupled to additional receivers (not shown) for capturing multiple frames of a scene. The disclosure is not to be limited to any specific examples or illustrations, including the example device 300.

The memory 306 may be a non-transient or non-transitory computer readable medium storing computer-executable instructions 308 to perform all or a portion of one or more operations described in this disclosure. If each light distribution projected by the projector 301 is divided into codewords, the memory 306 optionally may store a library of codewords 309 for each distribution of light including the plurality of codewords in the library 309. The library of codewords 309 may indicate what codewords exist in a distribution and the relative location between the codewords in the distribution. The device 300 may use the library of codewords 309 to identify codewords in one or more reflections within captures from the receiver 302 associated with a distribution of light corresponding to the library of codewords 309. The memory 306 (such as one or more library of codewords 309) may include additional information about one or more of the distributions of light. In some implementations, the memory 306 includes information regarding the emission time for a light distribution (such as the length of time the light distribution is to be projected before the projector 301 projects a different distribution of light). In some implementations, the library of codewords 309 may include different size codewords between the different distributions of light projected by the projector 301.

The processor 304 may be one or more suitable processors capable of executing scripts or instructions of one or more software programs (such as instructions 308 stored within the memory 306). In some aspects, the processor 304 may be one or more general purpose processors that execute instructions 308 to cause the device 300 to perform any number of functions or operations. In additional or alternative aspects, the processor 304 may include integrated circuits or other hardware to perform functions or operations without the use of software. In some implementations, the processor 304 includes one or more application processors to execute applications stored in executable instructions 308. For example, if the device 300 is a smartphone or other computing device, the processor 304 may execute instructions for an operating system of the device 300, and the processor 304 may provide instructions to the light controller 310 for controlling the active depth sensing system.

While shown to be coupled to each other via the processor 304 in the example of FIG. 3, the processor 304, the memory 306, the light controller 310, the optional display 314, and the optional I/O components 316 may be coupled to one another in various arrangements. For example, the processor 304, the memory 306, the light controller 310, the optional display 314, and/or the optional I/O components 316 may be coupled to each other via one or more local buses (not shown for simplicity).

The display 314 may be any suitable display or screen allowing for user interaction and/or to present items (such as a depth map, a preview image of a scene, a lock screen, etc.)

for viewing by a user. In some aspects, the display 314 may be a touch-sensitive display. The I/O components 316 may be or include any suitable mechanism, interface, or device to receive input (such as commands) from the user and to provide output to the user. For example, the I/O components 316 may include (but are not limited to) a graphical user interface, keyboard, mouse, microphone and speakers, squeezable bezel or border of the device 300, physical buttons located on device 300, and so on. The display 314 and/or the I/O components 316 may provide a preview image or depth map of the scene to a user and/or receive a user input for adjusting one or more settings of the device 300.

The light controller 310 may include a signal processor 312, which may be one or more processors to configure the projector 301 and process frames captured by the receiver 302. In some aspects, the image signal processor 312 may execute instructions from a memory (such as instructions 308 from the memory 306 or instructions stored in a separate memory coupled to the image signal processor 312). In other aspects, the image signal processor 312 may include specific hardware for operation. The image signal processor 312 may alternatively or additionally include a combination of specific hardware and the ability to execute software instructions.

In some implementations, the processor 304 may be configured to provide instructions to the image signal processor 312. The instructions may be executed by the image signal processor 312 to configure filters or other components of an image processing pipeline for processing frames from the receiver 302. The instructions may also be executed by the image signal processor 312 to configure the projector 301 for projecting one or more distributions of light for active depth sensing. While the following aspects of the disclosure may be described in relation to the device 300, any suitable device or configuration of device components may be used for performing aspects of the disclosure, and the present disclosure is not limited by a specific device configuration.

Figure 4:
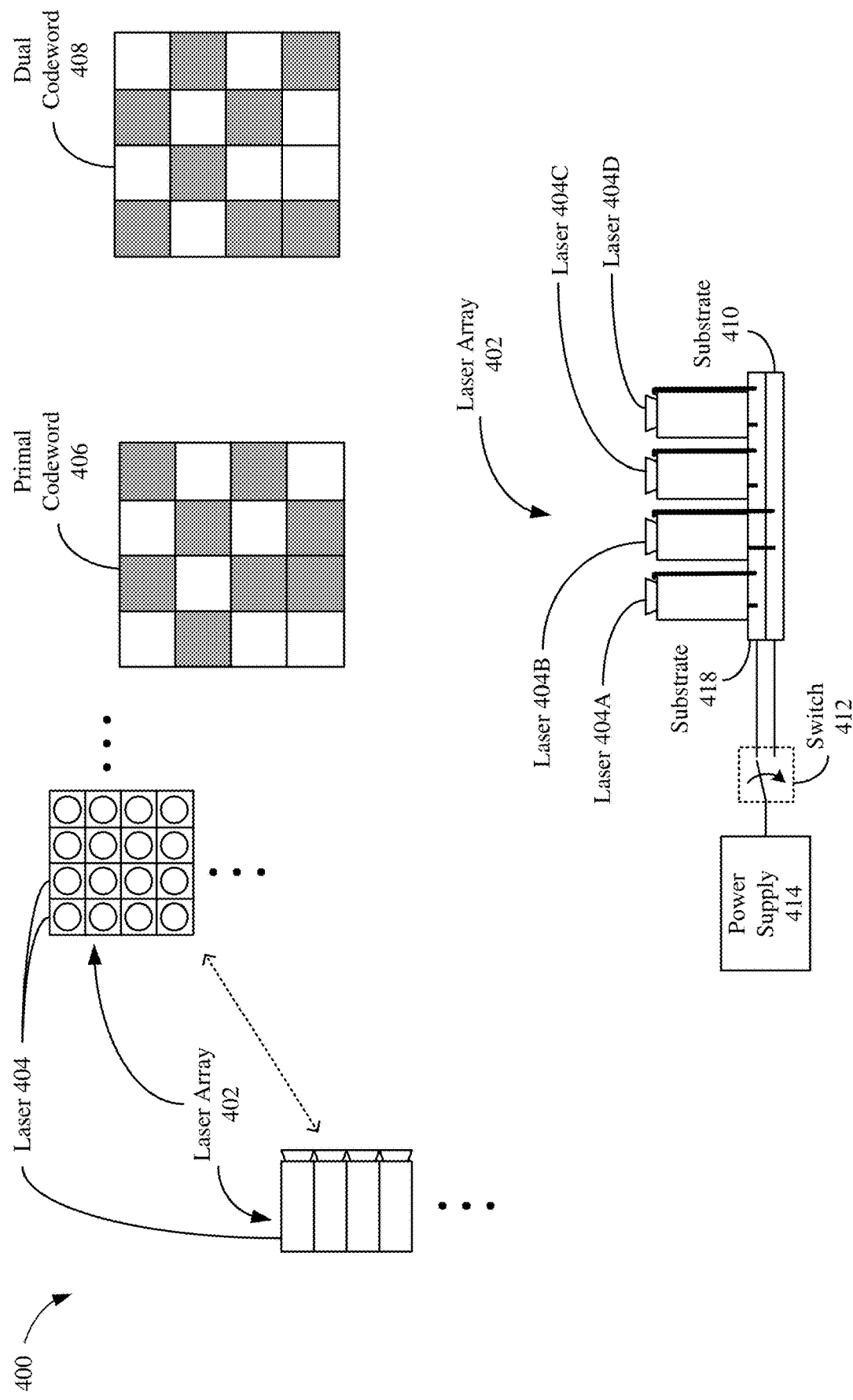
FIG. 4 is a depiction of an example laser array including lasers configured to emit a first distribution of light and one or more other distributions of light.

FIG. 4 is a depiction 400 of a laser array 402 including lasers 404 configured to emit a first distribution of light and one or more other distributions of light (including a second distribution of light). The laser array 402 may be of any suitable size. In some implementations, the laser array 402 includes an array of VCSELs (with each laser 404 being a VCSEL). In this manner, the illustrated portion of the laser array 402 may be configured to emit a first 4×4 codeword 406 and a second 4×4 codeword 408.

The distribution of light (including the codewords) may be optimized to improve depth sensing using the distribution of light. For example, the light points are positioned in the distribution of light to increase the probability of identifying the associated codeword in reflections of the light. If the laser array 402 is configured to emit two or more distributions of light, each of the distributions may be optimized (including optimization of the codewords). In this manner, a first distribution of light may be referred to as a primal distribution of light (including the primal codeword 406), and a second distribution of light may be referred to as a dual distribution of light (including the dual codeword 408). In the present disclosure, adjectives "primal" and "dual" refer to the distributions of light (and the associated codewords) being optimized.

For optimization, one or more criteria is met by the operation of the laser array 402 for the distributions of light to be optimized. One criteria may be that the distribution of light points in each codeword is unique. In this manner, multiple instances of the same codeword do not appear in a distribution of light. Other criteria may be that operation of a VCSEL during active depth sensing remains below a threshold duty cycle (e.g., a threshold ratio of the time a VCSEL is powered on or is pulsing compared to the time the VCSEL is not powered on or is not pulsing). In this manner, overheating of the laser array 402 is prevented. A further criteria may be the location of the light points causing a corresponding depth map to meet a threshold quality metric (such as below a number or ratio of invalid depth values during calibration).

The above criteria correspond to optimizing a single distribution of light. The distributions of light may also be optimized with reference to one another. For example, a further criteria may be that each VCSEL emits a light point during at least one of the multiple distributions of light emitted by the laser array 402. In this manner, the scene is more uniformly illuminated than if a single fixed distribution of light is used for active depth sensing. Additionally, the location of the primal codeword 406 in a primal distribution of light corresponds to the location of the dual codeword 408 in the dual distribution of light. Other criteria may be that codewords at corresponding locations between the primal distribution of light and the one or more dual distribution of light are unique to one another. In this manner, the same codeword is not used for the same location in the distribution of light. A further criteria may be that the average luminance or light intensity emitted by each VCSEL is approximately the same to the other VCSELs in the laser array. In this manner, one VCSEL's average intensity is not higher than others to allow the overall power to the VCSEL to be adjusted (thus adjusting the overall intensity of the distribution of light) while each VCSEL's emissions remain below a required threshold of intensity (such as based on eye safety standards, government regulations, and so on).

In this manner, as used herein, optimization may refer to configuring the different distributions of light to increase the accuracy and resolution of the depth maps (while conforming to device or regulation requirements). For example, the different distributions of light may be configured to reduce the areas in a depth map for which a depth value cannot be generated (such as by not identifying one or more codewords of a distribution of light). In another example, the different distributions of light may be configured to balance the resolution of a final depth map with reference to areas of the final depth map without depth values (such as the resolution meeting a first threshold and areas without a depth value remaining below a second threshold). Configuring the different distributions of light may include configuring the size of the codewords for each distribution of light, the emission time for each distribution of light, placement of codewords of each distribution of light, or the relationship between the region of different distributions of light. An example relationship between different distributions of light may include codewords in the same region being complementary to each other (such as primal codeword 406 and dual codeword 408). Optimization of the multiple distributions of light is described in more detail with reference to FIG. 10.

In some implementations, the laser array 402 may be configured to emit a dual distribution of light that is complementary to a primal distribution of light. For example, dual codeword 408 is complementary to primal codeword 406, where a VCSEL is either pulsing for the primal distribution of light or pulsing for the dual distribution of light. Also, referring back to FIGS. 2A and 2B, the distribution 252 in FIG. 2B is complementary to the distribution 202 in FIG.

2A. In this manner, each VCSEL (or other suitable laser or light source) is ensured to pulse at least for one of a first distribution of light or a second distribution of light. Additionally, a VCSEL or laser is at rest (not pulsing) when the other distribution of light is pulsed, which assists in preventing overheating of the laser array. In some implementations, each laser (such as each VCSEL) pulses for only one of a first distribution of light (which may be at a first time) or a second distribution of light (which may be at a second time). In this manner, the laser may emit for only one of the first time or the second time.

Referring back to FIG. 4, three lasers 404 emit light and one laser 404 does not emit light for the first column of the primal codeword 406. For the dual codeword 408 that is complementary to the primal codeword 406, the one laser 404 not emitting for the first column of the primal codeword 406 emits light for the dual codeword 408. Also, the three other lasers 404 do not emit light for the dual codeword 408. In some implementations, a first plurality of lasers 404 of the laser array 402 to emit light for a first distribution of light may be connected together, and a second plurality of lasers 404 of the laser array 402 to emit light for a second distribution of light may be connected together. For example, the lasers 404A, 404C, and 404D that are configured to emit light for the first column of the primal codeword 406 may be connected for coupling to a power supply 414 during a first time, and the laser 404B configured to emit light for the first column of the dual codeword 408 may be separately connected to other lasers of the array 402 for coupling to the power supply 414 during a second time. In some implementations, the lasers 404A, 404C, and 404D may be coupled via a substrate 418, and the laser 404B may be coupled with other lasers via a substrate 410. The projector may include a switch 412 configured to switch between coupling the substrate 418 to the power supply 414 and coupling the substrate 410 to the power supply 414.

If the distributions of light are complementary to one another, each laser 404 is coupled exclusively to the substrate 418 or the substrate 410. If the distributions of light are not complementary, one or more lasers may be coupled to both substrates 418 and 410. While not shown, the projector may be configured to emit three or more distributions of light. For example, the laser array 402 may be configured to emit a primal distribution, a first dual distribution, and a second dual distribution. Some of the first plurality of lasers 404 and the second plurality of lasers 404 of the laser array 402 may thus be coupled to a third substrate (not shown), and the switch 412 may be configured to switch between the three substrates (and thus switch the projector between emitting three different distributions of light). If a second dual distribution exists, at least one of the first dual distribution or the second dual distribution is not complementary to the primal distribution since codewords at corresponding locations in the different distributions are to be unique. Therefore, a dual distribution of light is not necessarily complementary to a primal distribution of light.

Figure 5:
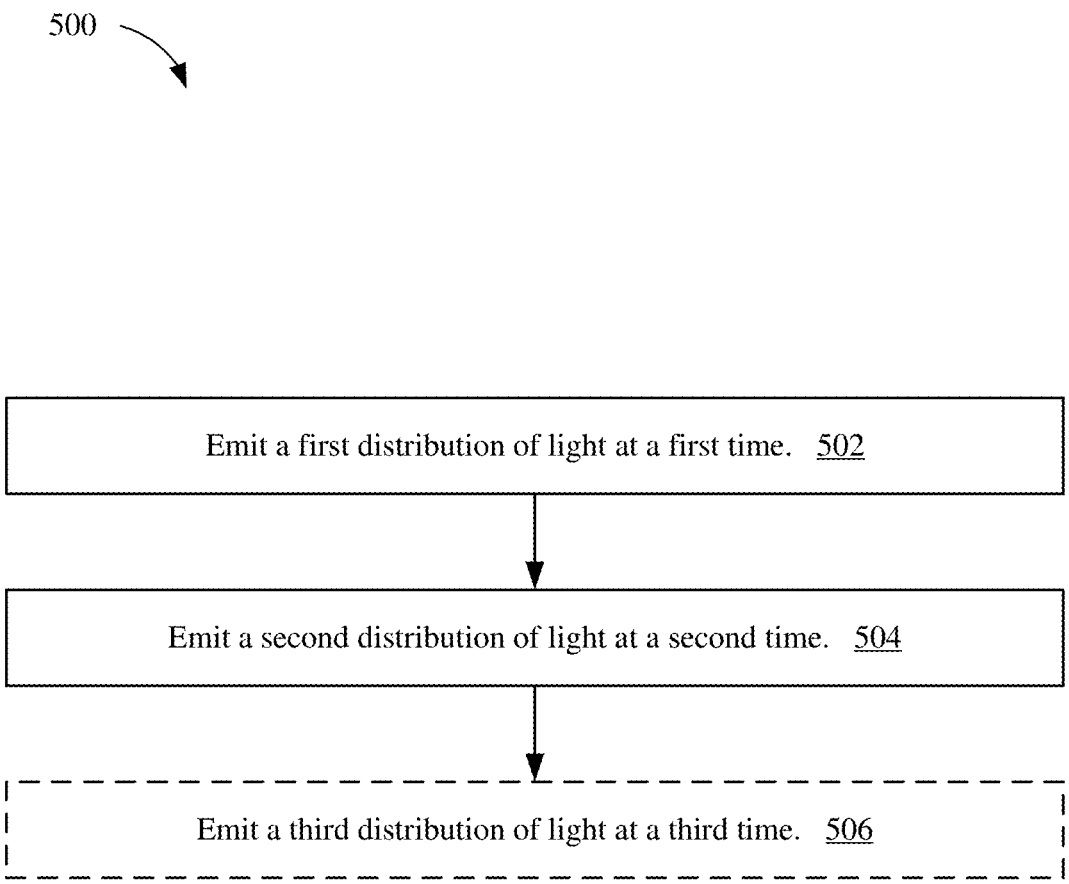
FIG. 5 is an illustrative flow chart depicting an example operation of a projector for active depth sensing.

As noted herein, the projector 301 (FIG. 3) is configured to switch between emitting a first distribution of light and emitting a second distribution of light (and, optionally, emitting additional distributions of light). FIG. 5 is an illustrative flow chart depicting an example operation 500 of the projector 301 for active depth sensing. At 502, the projector 301 emits a first distribution of light at a first time. At 504, the projector 301 emits a second distribution of light at a second time. A generated depth map of one or more objects in a scene is based on one or more reflections of the first distribution of light and one or more reflections of the second distribution of light. The first time and the second time may include any suitable instances of time (such as suitable start times or end times). The first time and the second time may also include any suitable durations of time (such as a first duration the first distribution of light is projected and a second duration the second distribution of light is projected). In some implementations, the projector 301 may also emit a third distribution of light at a third time (506). The projector 301 may further emit other distributions of light at other times (not shown). The generated depth map of one or more objects in the scene may also be based on one or more reflections of the third distribution of light (and one or more reflections of any other distributions of light).

The receiver 302 is configured to capture frames at a frame capture rate (such as at 30 frames per second). In some implementations, the projector 301 is configured to emit the first distribution of light for a first frame capture and to emit the second distribution of light for a second frame capture. In this manner, a single frame capture does not include reflections of both the first distribution of light and the second distribution of light. For example, a first plurality of lasers of a laser array may be configured to pulse light points during a first frame capture (such as at the beginning of the frame or exposure window for capturing the frame by the receiver 302), and a second plurality of lasers of the laser array may be configured to pulse light points during a second frame capture. In some implementations, a switch of the projector 301 is configured to configure which lasers are to pulse during which frame capture. In some other implementations, the pulsing and charging intervals for the lasers may be coordinated and timed such that the first plurality of lasers and the second plurality of lasers flash at the appropriate times for active depth sensing (such as during a first frame capture for the first plurality of lasers and during a second frame capture for the second plurality of lasers).

In some implementations, the projector 301 is configured to periodically alternate between emitting the first distribution of light and emitting the second distribution of light. Each emission of the first distribution of light may be associated with one frame of a first set of frame captures by an image sensor of the receiver 302, and each emission of the second distribution of light may be associated with one frame of a second set of frame captures by the image sensor of the receiver 302. The image signal processor 312 may be configured to generate a first set of depth values based on the first set of frames received from the receiver 302 and to generate a second set of depth values based on the second set of frames received from the receiver 302.

Figure 6:
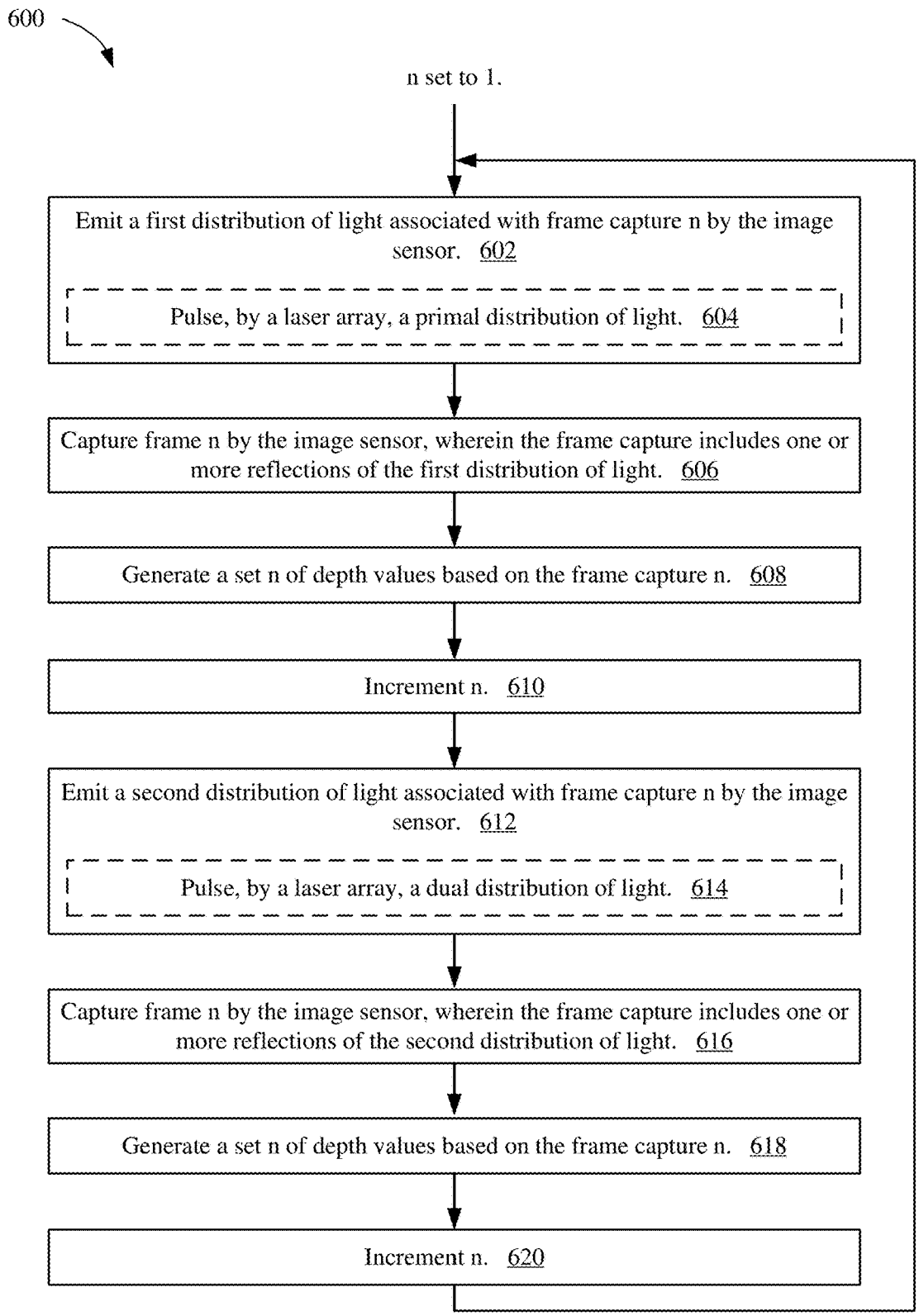
FIG. 6 is an illustrative flow chart depicting an example operation of active depth sensing based on the projector alternating between emitting a first distribution of light and emitting a second distribution of light.

FIG. 6 is an illustrative flow chart depicting an example operation 600 of active depth sensing based on the projector 301 alternating between emitting a first distribution of light and emitting a second distribution of light. With n set to 1, the projector 301 emits a first distribution of light during frame capture n by the image sensor of the receiver 302 (602). In some implementations, a laser array of the projector 301 pulses a primal distribution of light during frame capture n (604). At 606, the image sensor of the receiver 302 captures frame n, and the frame capture includes one or more reflections of the first distribution of light. The frame capture is provided to the light controller 310, and the image signal processor 312 generates a set n of depth values based on the frame capture (608). For example, the image signal processor 312 may generate a first depth map based on the frame capture by identifying codewords of the first distribution of light in the frame capture and determining depths of one or more objects in the scene based on the identified codewords.

Figure 7:
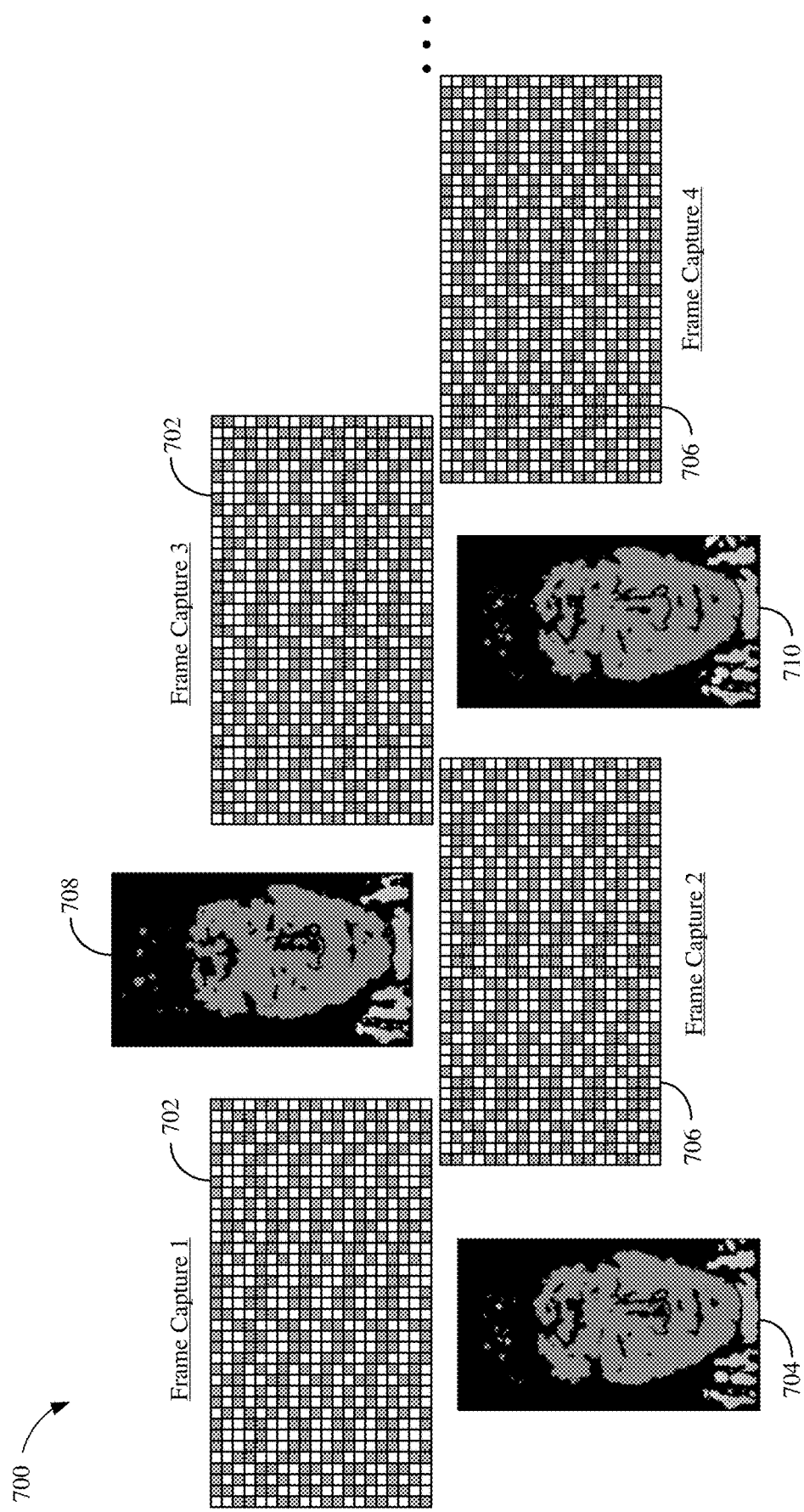
FIG. 7 is a depiction of example alternating emissions between a first distribution of light and a second distribution of light and the resulting depth maps.

To illustrate, FIG. 7 is a depiction 700 of example alternating emissions between a first distribution of light and a second distribution of light (such as by the projector 301 in FIG. 3). The depiction 700 also shows example resulting sets of depth values (illustrated as depth maps) for the alternating distributions of light. In the example implementation, the first distribution of light is the distribution 202 in FIG. 2A, and the second distribution of light is the distribution 252 in FIG. 2B. In such example, the first distribution of light is a primal distribution, and the second distribution of light is a dual distribution that is a complementary distribution of the first distribution of light. The projector 301 projects the first distribution 702 associated with frame capture 1. For example, the projector 301 may project the first distribution 702 during at least a portion of the exposure window for frame capture 1 (which may be referred to as during frame capture 1). The receiver 302 captures frame 1, and the image signal processor 312 generates a first set of depth values (which may be represented as the first depth map 704) based on the captured frame 1.

Referring back to FIG. 6, n may be incremented (610). The projector 301 may then emit a second distribution of light associated with frame capture n by the image sensor of the receiver 302 (612). For example, the projector 301 may project the second distribution 706 during at least a portion of the exposure window for frame capture n (which may be referred to as during frame capture n). In some implementations, a laser array of the projector 301 may pulse a dual distribution of light associated with frame capture n (614). At 616, the image sensor of the receiver 302 captures frame n, and the frame capture includes one or more reflections of the second distribution of light. The frame capture is provided to the light controller 310, and the image signal processor 312 generates a set n of depth values based on the frame capture (618). For example, the image signal processor 312 may generate a second set of depth values (such as of a second depth map) based on the frame capture by identifying codewords of the second distribution of light in the frame capture and determining depths of one or more objects in the scene based on the identified codewords. To illustrate, referring back to FIG. 7, the projector 301 projects the second distribution 706 associated with frame capture 2. The receiver 302 captures frame 2, and the image signal processor 312 generates a second set of depth values (represented by the second depth map 708) based on the captured frame 2.

Referring back to FIG. 6, n may be incremented (620), and the process may revert to step 602. To illustrate, referring back to FIG. 7, the projector 301 emits the first distribution of light 702 associated with frame capture 3, and the image signal processor 312 may generate depth values represented by the depth map 710 based on the captured frame 3. The projector 301 may then emit the second distribution of light 706 associated with frame capture 4, and the image signal processor 312 may generate depth values (which may be represented by a depth map that is not shown in FIG. 7) based on the captured frame 4. The projector 301 may continue to alternate between emitting the first distribution of light 702 and emitting the second distribution of light 706 for additional frames captured by the image sensor during active depth sensing, and the image signal processor 312 may continue to generate sets of depth values based on the frame captures by the receiver 302. While the example implementation in FIG. 6 and FIG. 7 depicts the projector 301 alternating between two distributions of light, the projector 301 may be configured to switch between three or more distributions of light. Additionally, while the example implementation in FIG. 6 and FIG. 7 depicts the projector 301 alternating for each frame capture, the projector 301 may alternate at any suitable time. For example, the projector 301 may alternate for every other frame capture or for every x number of frame captures.

The image signal processor 312 may generate a first set of depth values based on a first frame capture (such as depicted by the first depth map 704 in FIG. 7). The image signal processor 312 may also generate a second set of depth values based on a second frame capture (such as depicted by the second depth map 708 in FIG. 7). In some implementations, the image signal processor 312 may generate a set of depth values for each frame capture. As noted above, portions of each set of depth values may include invalid depth values. However, the locations in the scene corresponding to the invalid depth values for a first frame capture may differ from the locations in the scene corresponding to the invalid depth values for a second frame capture. The image signal processor 312 may be configured to combine the sets of depth values to generate a final set of depth values. In this manner, the number of locations in the scene associated with invalid depth values may be reduced if a location is associated with at least one valid depth value from the multiple sets of depth values. For example, referring back to FIG. 7, the device 300 may generate a first set of depth values that may be represented by the first depth map 704 of size P×Q, which is based on a first frame capture associated with the emission of the first distribution of light 702. The device 300 may also generate a second set of depth values that may be represented by the second depth map 708 of size P×Q, which is based on a second frame capture associated with the emission of the second distribution of light 706. The device 300 may be configured to combine at least portions of the first set of depth values (represented by the first depth map 704) and the second set of depth values (represented by the second depth map 708) to generate a final set of depth values (which may be represented by a final depth map). For example, the device 300 may compare one or more depth values at corresponding locations in the first and second depth maps to generate a final depth value at the location in the final depth map.

Figure 8:
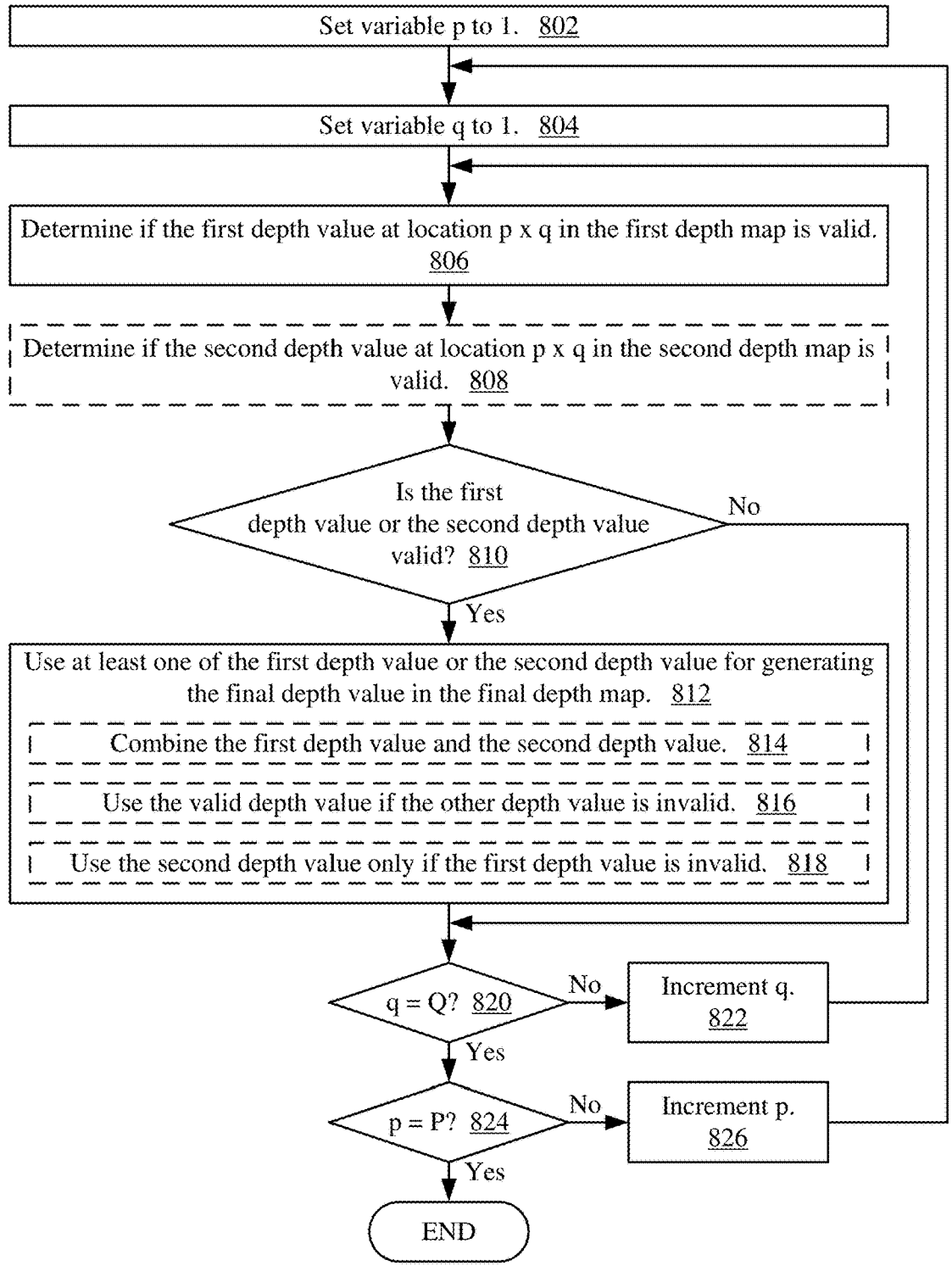
FIG. 8 is an illustrative flow chart depicting an example operation of combining a first set of depth values (such as for a first depth map) and a second set of depth values (such as for a second depth map) to generate a set of final depth values (such as for a final depth map).

FIG. 8 is an illustrative flow chart depicting an example operation 800 of combining depth values of a first depth map and depth values of a second depth map of size P×Q to generate depth values of a final depth map. At 802, variable p is set to 1 (with p less than or equal to P). Variable p is to keep track of the corresponding row of depth values in the depth maps during combination of depth values of the two depth maps. At 804, variable q is set to 1 (with q less than or equal to Q). Variable q is to keep track of the corresponding column of depth values in the depth map during combination of depth values of the two depth maps.

Figure 9:
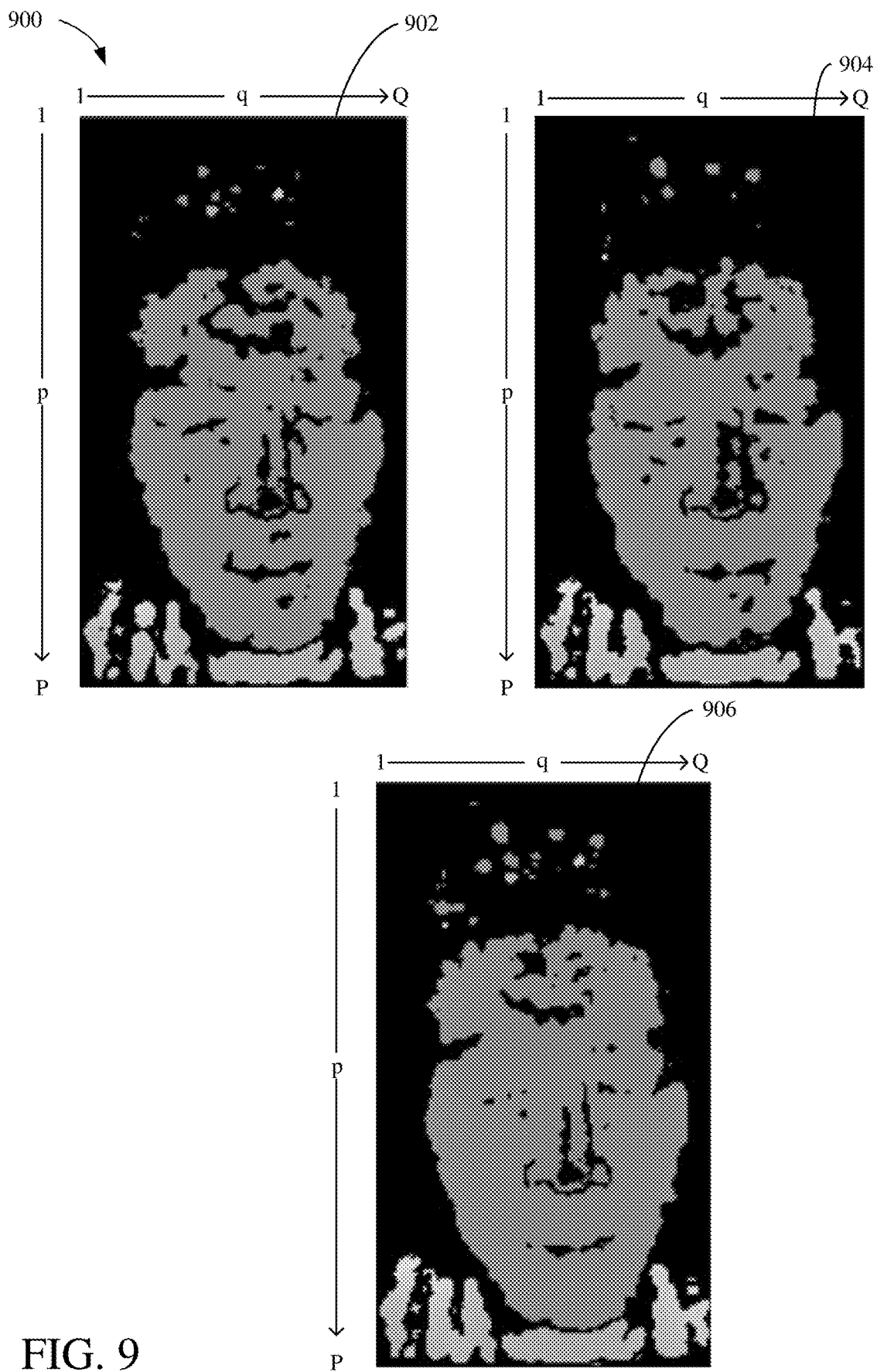
FIG. 9 is a depiction of an example first depth map and an example second depth map illustrating depth values to be combined to generate a final set of depth values.

The device 300 (such as the image signal processor 312 or other suitable device components) determines if the first depth value at location p×q in the first depth map is valid. FIG. 9 is a depiction 900 of an example first depth map 902 and an example second depth map 904 of depth values to be combined to generate depth values of a final depth map 906. The first depth map 902 may be a visual depiction of a first set of depth values determined by the image signal processor 312, and the second depth map 904 may be a visual depiction of a second set of depth values determined by the image signal processor 312. As shown, the first depth map 902 is of size P×Q, and the second depth map 904 is of size P×Q. The depth values of depth maps 902 and 904 are combined to generate depth values of the final depth map 906 of size P×Q. The device 300 may determine if the depth value at 1×1 in the first depth map 902 is valid. In generating invalid depth values, if an insufficient number of light points are identified or positions of light points are not identified for the portion of reflections associated with the location 1×1 in the depth map 902, the device 300 may be unable to identify the codeword associated with the location. The device 300 may thus not determine a valid depth value for the location. The device 300 indicates that the location is associated with an invalid depth value by setting the depth value to a predefined value, indicating an invalid depth value by using a not a number (NaN) indication, leaving the depth value blank for the location, or by any other suitable means to indicate an invalid depth value. In some implementations, the device 300 may identify multiple possible codewords that may be present in the portion of the reflections associated with the location 1×1 in the depth map 902. In this manner, the device 300 may associate a confidence value with each possible codeword based on the likelihood the codeword exists in the portion of the reflections. For example, the device 300 may identify 75 percent of the light points of a possible codeword in correct positions relative to one another, but the device 300 is unable to identify 25 percent of the light points of the possible codeword. Similar identifications may be performed for the other possible codewords. In this manner, the device 300 may determine that two or more codewords are equally likely to be associated with the location (such as a 50 percent confidence value for two codewords). As such, the device 300 is unable to determine the actual codeword associated with the location. In some implementations, the device 300 determines that a depth value is valid based on the identified codeword with the greatest confidence value having its confidence value above a threshold. While identifying a single codeword exclusively based on identifying light points of the codeword in the reflections is provided in the above example, identification of the codeword (such as generating a confidence value for a possible codeword) may also be based on identifying neighboring codewords in the reflections, identifying codewords associated with the other light distributions and corresponding to the present codeword to be identified, or other suitable parameters in identifying the codeword. If a codeword is identified for the location, the device 300 may determine a valid depth value for the location in the depth map 902 based on the location and distortion of light points of the codeword in the reflections relative to one another.

In determining that a depth value is invalid, the device 300 may determine that the depth value is set to a predetermined value to indicate an invalid depth value, that the depth value is not set to a number or value, that the depth value is associated with a NaN indication, or any other suitable indication that the depth value is an invalid depth value. The depth map 902 is shaded black at location 1×1, indicating an invalid depth value for the location in the depth map 902.

Referring back to FIG. 8, in some implementations, the device 300 may also determine if the second depth value at location p×q in the second depth map is a valid depth value (808). For example, the device 300 may determine if the depth value at location 1×1 in the depth map 904 (FIG. 9) is valid (such as described above). The depth map 904 is shaded black at location 1×1, indicating an invalid depth value for the location in the depth map 904.

In this manner, the final depth value at location p×q in the final depth map is based on the validity of the first depth value and/or the second depth value. In some other implementations, if the first depth value is valid, the device 300 may use the first depth value as the final depth value (regardless of a second depth value). For example, for a depth map associated with a primal distribution of light, if the depth value is valid, the valid depth value is automatically used as the final depth value for the final depth map without consideration of the validity of the depth value from the depth map associated with a dual distribution of light. In another example, for a depth map that is a most recent depth map from the depth maps being combined, if the depth value is valid, the valid depth value is automatically used as the final depth value. In this example, if more than two sets of depth values (which may correspond to two or more depth maps) are to be combined, the device 300 may use the depth value from the most recent set of depth values (corresponding to the most recent depth map) in which the depth value is determined valid. In such examples, if the first depth value is invalid, the device 300 may continue with determining the validity of the second depth value in order to determine if any valid depth value exists that corresponds to location p×q in a final depth map.

Referring back to FIG. 8, if neither the first depth value nor the second depth value is a valid depth value (810), the device 300 prevents determining a final depth value that is valid at location p×q in the final depth map. For example, the device 300 may set the final depth value to an invalid value (such as a NaN indication to indicate infinity or an error, a predefined value, and so on). The process then proceeds to decision 820. As illustrated in FIG. 9, the final depth value at location 1×1 in the final depth map 906 is an invalid depth value (indicated by a black shade in the top left corner of the depth map 906).

Referring back to decision 810 in FIG. 8, if at least one of the first depth value or the second depth value is valid, the device 300 may use at least one of the first depth value or the second depth value for generating the final depth value in the final depth map (812). In some implementations, if both the first depth value and the second depth value are valid, the device 300 combines the first depth value and the second depth value (814). For example, the device 300 may average the depth values. In some other examples, the device 300 may find a median depth value, perform a weighted average based on age of the depth map, or any other suitable means for combining the depth values.

In some other implementations of generating the final depth value, the device 300 may use the valid depth value from the first depth value or the second depth value if only one of the depth values is valid (816). For example, if the first depth value is valid and the second depth value is invalid, the device 300 may set the final depth value as the first depth value. In some further implementations of generating the final depth value, the device 300 may use the second depth value (which is valid) only if the first depth value is invalid (818). For example, the device 300 may use the first depth value as the final depth value whenever the first depth value is valid (even when the second depth value may be valid). However, if the first depth value is invalid and the second depth value is valid, the device 300 may use the second depth value as the final depth value.

Proceeding to decision 820, if variable q does not equal Q (the device 300 has not generated a final depth value for each column q along row p), q is incremented (822), and the process reverts to step 806. At 820, if variable q equals Q, the process proceeds to decision 824. At 824, if variable p does not equal P (the device 300 has not generated final depth values for each row p of the final depth map), p is incremented (826), and the process reverts to step 804. At 824, if variable p equals P, all of the final depth values (for a final depth map) have been generated, and the process ends. As illustrated in FIG. 9, in some implementations, the device 300 may proceed through comparing depth values in a depth map sequentially in a row by row, from top to bottom manner. However, any suitable means of stepping through the depth values of a depth map may be used (such as bottom to top, pseudo-random, or other means). Referring to FIG. 9, the set of final depth values illustrated by the final depth map 906, which is a combination of the first set of depth values illustrated by the first depth map 902 and the second set of depth values illustrated by the second depth map 904, includes less invalid depth values than either the first set or the second set of depth values (as illustrated by less locations of invalid depth values in final depth map 906 than in depth maps 902 and 904). For example, there exists less black area at the mouth and eyes of the face in the final depth map 906 than at the mouth and eyes of the face in depth maps 902 and 904.

While FIG. 8 and FIG. 9 depict two depth maps (representing two sets of depth values) being combined to generate a final set of depth values of a final depth map, any number of sets of depth values may be combined to generate a final set of depth values. In some implementations, if three or more sets of depth values are combined, the example operation 800 may be extended to combine the multiple sets of depth values. For example, valid depth values may be averaged, or the most recent depth value that is valid may be used, to generate a final depth value.

In some other implementations, multiple sets of depth values may be associated with the same distribution of light. For example, referring back to FIG. 7, depth map 704 and depth map 710 illustrate two sets of depth values associated with the first distribution of light 702, and depth map 708 (and another depth map for frame capture 4 not shown) illustrate two sets of depth values associated with the second distribution of light 706. As a result, there may exist a first number of sets of depth values associated with different frame captures but with the same first distribution of light, and there may exist a second number of sets of depth values associated with different frame captures but with the same second distribution of light. If the projector 301 projects three different distributions of light, there may exist a third number of sets of depth values associated with different frame captures but with the same third distribution of light.

In some implementations, the sets of depth values may be combined together as described herein with reference to FIG. 8. In some other implementations, the depth values associated with the first distribution of light may be combined to generate a first set of final depth values, the depth values associated with the second distribution of light may be combined to generate a second set of final depth values, and the first set of final depth values and the second set of final depth values may be combined to generate the overall set of final depth values. Each operation of combining the sets of depth values (such as to generate the first set of final depth values, to generate the second set of final depth values, or the generate the overall set of final depth values) may be as described herein with reference to FIG. 8. However, while some implementations for combining depth sets of depth values have been described, any suitable means for generating a final set of depth values (such as for a final depth map) based on two or more sets of depth values may be performed. For example, for clarity, FIG. 8 depicts combining sets of depth values of similar sizes (represented by similar size depth maps). In some other implementations, the depth maps or sets of depth values may be different sizes. For example, a first distribution of light may be associated with codewords of a first size, and a second distribution of light may be associated with codewords of a second size. In this manner, a first depth map generated based on the first distribution of light and a second depth map generated based on the second distribution of light are different sizes. In combining the first depth map and the second depth map, each location in the first depth map may be associated with a location in the second depth map. If different size codewords are used, a location p×q in a first depth map of size P×Q may correspond to a location r×s in a second depth map of size R×S. The corresponding locations of depth values between depth maps may be based on a similar location within its respective depth map. For example, location p×q in the first depth map may correspond to location r×s in the second depth map if $(p/P, q/Q) \cong (r/R, s/S)$. The depth values associated with the corresponding locations may be combined to generate a final depth value. The final depth map may be any suitable resolution. For example, the final depth map may be the first size (of the first depth map), the second size (of the second depth map), or a size between the first size or the second size. To generate the final set of depth values, any suitable means for combining the depth values from different size sets may be performed.

Referring back to FIG. 6 and FIG. 7, while the above methods have been described in generating set of depth values or depth maps separately for different distributions, reflections from one distribution may be used to assist in identifying codewords in reflections from the other distribution. For example, for a primal distribution of light and a dual distribution of light, the device 300 may map or otherwise determine corresponding locations of codewords between the distributions of light. Such a mapping may be stored in the memory 306 (such as being included in one or more library of codewords 309). In one specific example, if the dual distribution of light is complementary to the primal distribution of light, when a codeword is identified in a frame capture for the dual distribution of light, the device 300 determines that the complement of the codeword exists at a similar location in another frame capture for the primal distribution of light. In this manner, determining a depth value for a same region of the scene corresponding to the primal and dual distributions of light may be based on identifying a codeword from any of the distributions of light. Additionally, identifying codewords in multiple distributions of light corresponding to the same region of the scene allows the device 300 to verify that one or more codewords are not misidentified. Identifying codewords in the image sensor capture including reflections of a distribution of light may be referred to as decoding, and using multiple distributions of light for different frame captures to decode a similar location in the distributions of light may be referred to as complementary decoding. Complementary decoding reduces the effect of speckle interference preventing identification of one or more codewords (and thus determining a valid depth value for a location in the scene) because such complementary decoding provides spatial diversity in light transmission and reception.

As described herein, a projector 301 may be configured to emit different distributions of light at different times, and the different distributions of light may be used in generating a final set of depth values (such as for a final depth map) of a scene. A first distribution of light may differ from a second distribution of light in one or more ways. In some implementations, the first distribution of light may differ spatially from the second distribution of light, and the first distribution of light may differ temporally from the second distribution of light. In differing spatially, the first distribution of light and the second distribution of light may include different locations of light points. In differing temporally, the first distribution of light and the second distribution of light may be projected for different durations of time. In addition, parameters of the sets of depth values to be combined may differ. For example, a first set of depth values or depth map may be a first size or resolution, and a second set of depth values or depth map may be a second size or resolution. The first size and the second size may be based on different size codewords for the first distribution of light and for the second distribution of light.

Determining the multiple distributions of light (including the spatial distribution of light points, the time and duration of projecting the light points, and the size of the codewords for each distribution of light) may be conceptualized as a multiple dimension problem. One or more dimensions may include one or more spatial dimensions, a temporal dimension, and an array dimension (for which the array is the sequence of the multiple distributions of light with reference to one another). For example, if a first distribution of light is (X1,Y1) (with (x1,y1) in (X1,Y1) indicating a VCSEL in the VCSEL array at a location of row x1 and column y1), a second distribution of light is (X2,Y2), one or more temporal aspects of projecting (X1,Y1) and (X2,Y2) is T, and an array of (X1,Y1) and (X2,Y2) in sequence is Z, the multiple dimension problem may include configuring (X1,Y1), (X2,Y2), and T (with Z based on (X1,Y1) and (X2,Y2)) to optimize the projected distributions for active depth sensing. Optimizing the multiple distributions of light may include configuring (X1,Y1), (X2,Y2), and T to improve resolution and decoding success for a final depth map. While two distributions of light (X1,Y1) and (X2,Y2) are described in the examples, any number of distributions may be configured (such as (X3,Y3), (X4,Y4), and so on).

Distributions of light (X1,Y1) and (X2,Y2) are of the same size (X1=X2 and Y1=Y2). Each location (x, y) in (X1,Y1) may be zero to indicate no light projected for the location or one to indicate light projected for the location. Each location (x, y) of (X2,Y2) may be zero to indicate no light projected for the location or one to indicate light projected for the location. If (X1,Y1) and (X2,Y2) are complementary, the value at location (x, y) of (X2,Y2) ((x2,y2)) may be the inverse of the value at location (x, y) of (X1,Y1) ((x1,y1)). For example, if (X1,Y1) and (X2,Y2) are complementary and (x1,y1) equals 1, then (x2,y2) equals 0. Z may be conceptualized as an array (Z1,Z2) for which each (z1, z2) in (Z1,Z2) equals ((x1,y1), (x2,y2)).

T may include component t1 associated with projecting (X1,Y1) and component t2 associated with projecting (X2,Y2). Component t1 may indicate a duration of time that (X1,Y1) is projected, and component t2 may indicate a duration of time that (X2,Y2) is projected. The duration may be a duration associated with a frame capture or an overall duration associated with multiple frame captures. For example, t1 may be the duration that (X1,Y1) is projected for a frame capture 1, and t2 may be the duration that (X2,Y2) is projected for a frame capture 2. In another example, t1 may be an average duration, median duration, or total duration over two or more frame captures 1, 3, 5, and so on. t1 may be an average duration, median duration, or total duration over two or more frame captures 2, 4, 6, and so on. In this manner, the first distribution of light (including t1) may be defined as (X1,Y1,t1), and the second distribution of light (including t2) may be defined as (X2,Y2,t2). Therefore, determining (X1,Y1), (X2,Y2), and T includes determining (X1,Y1,t1) and (X2,Y2,t2) in optimizing the distributions of light.

As noted above, optimizing the distributions of light may include increasing the resolution and/or decoding success of depth values for a final depth map (while conforming to device or regulation requirements). In some implementations, multiple candidate distributions of light are determined (such as multiple first distributions of light (X1,Y1,t1) and their associated second distribution of light (X2,Y2,t2)). A test scene is used to generate a final set of depth values of a final depth map for each candidate, and the final sets of depth values (such as the final depth maps) may be compared to determine the final first distribution of light and final second distribution of light.

Figure 10:
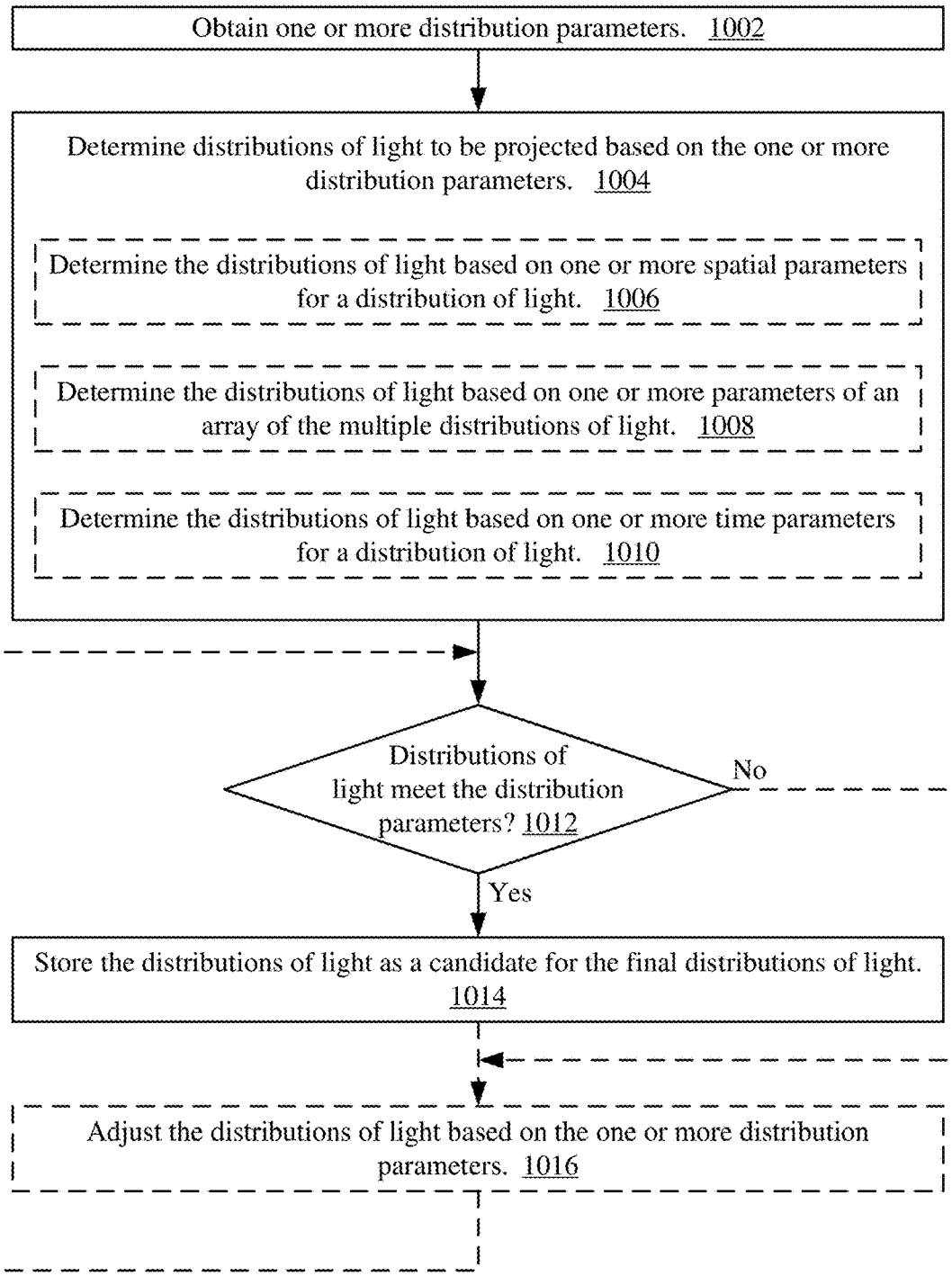
FIG. 10 is an illustrative flow chart depicting an example operation of optimizing distributions of light for projection for active depth sensing.

FIG. 10 is an illustrative flow chart depicting an example operation 1000 of optimizing distributions of light for projection for active depth sensing. For example, operation 1000 may be performed in optimizing (X1,Y1,t1) and (X2,Y2,t2). At 1002, the device 300 (FIG. 3) may obtain one or more distribution parameters. Distribution parameters may include one or more parameters to configure the first distribution of light (such as (X1,Y1,t1)) and the second distribution of light (such as (X2,Y2,t2)). The one or more distribution parameters may be based on device limitations, standards requirements, safety regulations, or best practices.

Regarding device limitations, one or more components of the device 300 may have physical limitations or requirements. For example, a VCSEL may have a maximum duty cycle (for when the VCSEL is emitting light) to prevent overheating. In this manner, the one or more distribution parameters (which may be used to determine t1 and t2 for the VCSEL) may be based on the maximum duty cycle. In another example, each image sensor pixel that receives reflections of the light emitted by the VCSEL is associated with an amount of light at which the image sensor pixel is saturated. In this manner, the one or more distribution parameters (which may be used to determine t1 and t2 for the VCSEL) may be based on the amount of light associated with an image sensor pixel being saturated. Additionally, if reflections from multiple locations of (X1,Y1) or (X2,Y2) are received at an image sensor pixel, the one or more distribution parameters (which may be used to determine (X1,Y1) or (X2,Y2)) may be based on the amount of light associated with an image sensor pixel being saturated. For example, if each location (x1,y1) in (X1,Y1) corresponds to a VCSEL in a VCSEL array, whether one or more VCSELs are emitting light during emission of the first distribution of light or the second distribution of light may be based on the amount of light associated with one or more image sensor pixels being saturated.

The device 300 may also be required to comply with one or more standards (such as from the Institute of Electrical or Electronics Engineering (IEEE) or another standards body) or with one or more regulations (such as from a federal, state, provincial, international, or other governing body). For example, for some wavelengths of emitted light, an amount of emitted light from a VCSEL over an amount of time may be required to be under a maximum amount of energy. In this manner, a combination of the VCSEL's intensity of emission and duration of emission may be configured to be less than the maximum amount of energy. A combination of a plurality of VCSELs (such as the entire VCSEL array or a portion of the VCSEL array) may also be configured such that the intensities of emission and durations of emission cause a total energy for the emission over an amount of time to be less than a maximum amount of energy. In this manner, how many VCSELs in a region emit light at the same time and/or a duty cycle of each VCSEL in the region to emit light may be determined and adjusted to comply with any suitable standards and regulations, and the distributions of light may be configured based on such determinations and adjustments.

In addition to physical limitations, standard requirements, or regulatory requirements, the light distributions may also be based on one or more best practices. As used herein, a best practice may include one or more concepts for designing the distributions of light to improve performance of the active depth sensing system. In some implementations, a best practice may include configuring the distributions of light such that the entire scene is evenly illuminated. Even illumination of the scene may allow for codewords to be identified in more regions of the reflections from the scene than if the scene is unevenly illuminated. For example, if a codeword is associated with only one light point being emitted (only one VCSEL emits light for the codeword), the location of the light point may be difficult to identify in the reflections, and the codeword may not be identified. Conversely, if a codeword is associated with all possible light points being emitted except one (only one VCSEL does not emit light for the codeword), the location of the light point in the reflections may be difficult to identify, and the codeword may not be identified. For example, if a first distribution of light includes 4×4 size codewords, a first codeword is associated with only one VCSEL to emit light, and a second codeword is associated with 15 VCSELs to emit light, the first codeword and the second codeword may be difficult to identify in the reflections. The first distribution of light may be configured such that each codeword of the first distribution of light is associated with a minimum number of VCSELs emitting light. In some implementations, the first distribution of light may also be configured such that each codeword is associated with a maximum number of VCSELs emitting light. In this manner, each codeword of the first distribution of light is associated with a bounded range of the VCSELs to emit light (such as for 16 VCSELs per codeword, a range of 6-11 VCSELs or another suitable range). If the second distribution of light is complementary to the first distribution of light (and with the same size codewords as the first distribution of light), each codeword of the second distribution of light may also be associated with the bounded range of the VCSELs to emit light. In this manner, the scene may be evenly illuminated by both the first distribution of light and the second distribution of light.

In another example of best practices, codewords associated with less light points may neighbor codewords associated with more light points in a distribution of light. In this manner, a location of a codeword with reference to other codewords in the reflections may be based on not just the identified locations of light points, but also the identified number of light points in a region of the reflections. In a further example of best practices, neighboring VCSELs for a codeword or for neighboring codewords may be configured to not all emit for a distribution of light. For example, VCSELs from a 3×3 portion of the VCSEL array may not all emit light for the same distribution of light. In this manner, the light points may not be concentrated to one or more regions of the distribution of light.

While some example device limitations, standards requirements, regulatory requirements, and best practices are provided as example distribution parameters, other suitable device limitations, standards requirements, regulatory requirements, and best practices may be used. The examples are provided for describing aspects of the present disclosure, but the distribution parameters are not limited to the provided examples. As such, any suitable distribution parameters may be obtained and used.

In some implementations, a distribution parameter may be categorized as a spatial parameter. As used herein, a spatial parameter may refer to a distribution parameter used to determine locations of the light points in the distributions of light. As such, a spatial parameter may be used to configure X1 and Y1 of a first distribution of light and to configure X2 and Y2 of a second distribution of light. The number of light points per codeword and the locations of light points per codeword may be example spatial parameters.

In some implementations, a distribution parameter may be categorized as a parameter of the array. As used herein, a parameter of the array may refer to a distribution parameter used to determine restrictions on multiple distributions of light based on their relationship to one another. For example, a parameter of the array may be that each VCSEL is to emit light during at least one distribution of light. If only two distributions of light or emitted, a second distribution of light may be determined to be complementary to the first distribution of light to ensure that each VCSEL emits light during one of the distributions of light being emitted.

In some implementations, a distribution parameter may be categorized as a time parameter. As used herein, a time parameter may refer to a distribution parameter used to determine a time for emitting a distribution of light. As such, a time parameter may be used to configure t1 of a first distribution of light or to configure t2 of a second distribution of light. As an example, if a VCSEL's intensity of emission does not vary when emitting, a maximum amount of energy limitation for a VCSEL being met may be based on the duration of the VCSEL emitting light. As such, a time parameter may include the maximum amount of time that the VCSEL may emit light for a distribution of light.

A distribution parameter may exist in multiple categories. For example, the maximum amount of time that the VCSEL may emit light for a distribution of light (from the above example of a time parameter) applies to each distribution of light. As such, the maximum amount of time may also be a parameter of the array. In another example, a maximum amount of energy limitation may also apply to a region of the distribution of light covering a plurality of neighboring VCSELs. As such, meeting the maximum amount of energy limitation may be based on the time of emission as well as the location of the emissions. The distribution parameter may thus be a spatial parameter and a time parameter.

Referring back to FIG. 10, the device 300 may determine the distributions of light to be projected based on the one or more distribution parameters (1004). For example, the device 300 may configure a first distribution of light (such as (X1,Y1,t1)) and a second distribution of light (such as (X2,Y2,t2)) based on the one or more distribution parameters. In some implementations, the device 300 determines the distributions of light based on one or more spatial parameters for a distribution of light (1006). In some implementations, the device 300 determines the distributions of light based on one or more parameters of the array of the multiple distributions of light (1008). In some implementations, the device 300 determines the distributions of light based on one or more time parameters for a distribution of light (1010).

In one example of the device 300 configuring a first distribution of light (such as (X1,Y1,t1)) and a second distribution of light (such as (X2,Y2,t2)) based on the one or more distribution parameters, the device 300 may use a preset configuration of a first distribution of light and a second distribution of light. For example, a final (X1,Y1,t1)

and (X2,Y2,t2) previously determined for another device, theoretically designed for the device 300, or otherwise determined may be provided to the device 300 or stored in the device 300 (such as in the memory 306). The provided or stored (X1,Y1,t1) and (X2,Y2,t2) may then be used to set the initial first distribution of light and the initial second distribution of light. At decision block 1012, if the distributions of light meet the distribution parameters, operation 1000 may proceed to step 1014. At 1014, the device 300 may store the distributions of light as a candidate for the final distributions of light.

In some implementations of determining whether the distributions of light meet the distribution parameters, the device 300 may use the distributions of light to perform active depth sensing on a scene. For example, during calibration of the device 300, a test scene may be placed in the field of emission for the distributions of light. Active depth sensing may be performed, and the resulting depth values may be reviewed to determine if each distribution parameter is met. If distributions of light determined for another device are used, the distributions of light may not be sufficient for device 300 such that the distributions parameters are met. For example, differences, in lenses, image sensors, or other device components may cause the distributions of light to not meet one or more distribution parameters. In another example, previously determined distributions of light may not be suitable for current use cases. For example, if the distributions of light are designed for objects further away from the device 300 than the objects in the scene (such as the test scene), the distributions of light may be determined to not meet one or more distribution parameters based on the difference in depths. Referring back to decision block 1012, if the distributions of light do not meet the distribution parameters, the device 300 may not store the distributions of light as a candidate for the final distributions of light.

In some implementations, if the distributions of light are a candidate for the final distributions of light, the distributions of light may be used by the device 300 for further active depth sensing without adjusting the distributions of light. In this manner, the first candidate distributions of light may be the final distributions of light used for active depth sensing.

In some other implementations, the distributions of light may be adjusted to attempt to improve the performance of active depth sensing based on the scene, or the distributions of light may be adjusted to attempt to cause the distributions of light to meet the distribution parameters. For example, at 1016, the device 300 may adjust the distributions of light based on the one or more distribution parameters. The process may revert to decision block 1012, and the adjusted distributions of light may be used in active depth sensing to determine is the adjusted distributions of light are a candidate for the final distributions of light.

While not shown, the results from using the candidate distributions of light may be compared to determine the final distributions of light. For example, a depth map or the depth values determined using a first candidate may be compared to a depth map or the depth values determined using a second candidate. The candidate selected as the final distributions of light may be based on any suitable criteria. For example, the final distributions of light may be based on the candidate distributions of light causing the least number of invalid depth values in a depth map (such as the least amount of black space in the depth map 906 in FIG. 9). In another example, the final distributions of light may be based on the candidate distributions of light causing less than a maximum threshold of invalid depth values in a depth map while providing a depth map with a resolution greater than a minimum threshold. The candidate used to generate the highest resolution depth map with the fewest number of invalid depth values (that is below the maximum threshold) may be the final distributions of light.

Referring back to step 1016, any suitable adjustments to the distributions of light may be performed. In some implementations, adjustment of the distributions of light may be a feedback system to generate one or more candidates. For example, the adjustments may be based on the current distributions of light and the one or more distribution parameters.

Figure 11:
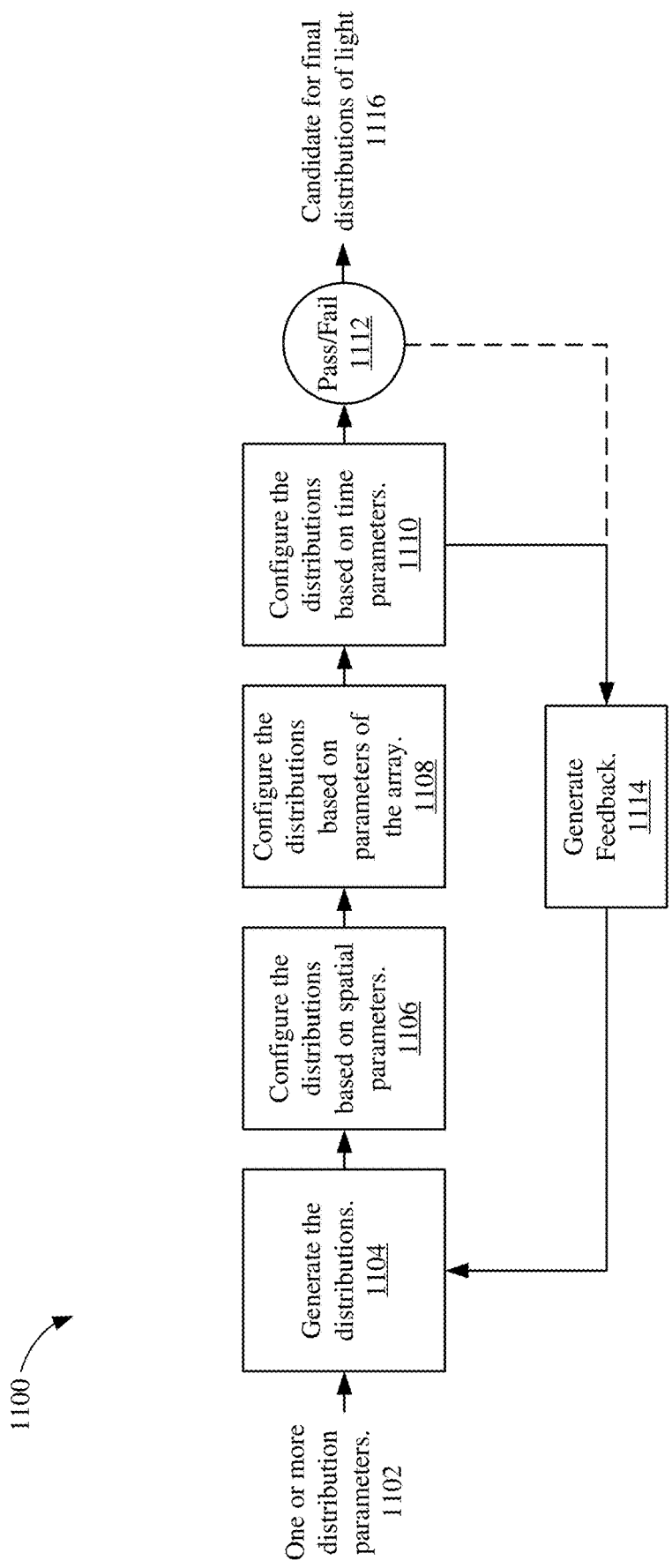
FIG. 11 is a depiction of an example feedback system for determining one or more candidates for final distributions of light for active depth sensing.

FIG. 11 is a depiction of an example feedback system 1100 for determining one or more candidates for final distributions of light. The process of the example feedback system 1100 is described as being performed by the device 300 (FIG. 3). For example, the process may be performed by the light controller 310 or the processor 304. However, the process may be performed by any suitable device component. Alternatively, the process may be performed by another device. For example, if the device 300 is being calibrated during manufacturing, calibration equipment or testing equipment may perform the process to determine the final distributions of light. As such, the process of the example feedback system 1100 is not limited to being performed by a specific device component or the device 300 itself.

At 1104, the device 300 may generate distributions of light based on the one or more distribution parameters 1102. As used in the example, generating the distributions of light includes determining which VCSELs of the VCSEL array are to emit light during each distribution of light and determining the time at which each distribution of light is to be emitted. For example, for a first distribution of light and a second distribution of light to be generated, the device 300 may determine (X1,Y1,Z,t1) and (X2,Y2,Z,t2) (or (X1,Y1, t1) and (X2,Y2,t2) with Z inferred from the determined variables). If the distributions of light are being generated for the first time for the feedback system 1100, there may not be any feedback for previous distributions of light. In some implementations, the initial distributions of light may be a preconfigured set of distributions (such as distributions of light determined for another device or determined based on simulation or theoretical operation of the device 300).

If the distributions of light are subsequent to previous distributions of light, generating the distributions of light at 1104 may also be based on feedback regarding the previous distributions of light. In some implementations, generating distributions of light based on feedback regarding previous distributions of light may include adjusting the previous distributions of light. For example, one or more of the variables (X1,Y1,t1) or (X2,Y2,t2) for the previous distributions may be adjusted based on the feedback and the one or more distribution parameters 1102 to generate the distributions of light at 1104. In some other implementations, generating distributions of light at 1104 includes using the previous distributions of light. The distributions of light may then be adjusted at 1106-1110. In some other implementations, the device 300 may generate new distributions of light based on the feedback and the one or more distribution parameters. For example, a second set of predefined distributions may be stored or received, and generating the distributions of light at 1104 may include the device 300 using the second set of distributions. In some implementations, the second set of distributions may be amended based on the feedback and the one or more distribution parameters 1102. In some other implementations, additional sets of distributions may be stored or obtained. The device 300, in generating the distributions of light at 1104, may select one of the sets as the distributions of light based on the feedback and the one or more distribution parameters 1102. For example, if a time parameter is not met using the previous distributions of light (which may be indicated by the feedback), the device 300 may select a set of distributions with a different t1 or t2 than for the previous distributions of light.

At 1106, the device 300 may configure the generated distributions of light based on one or more spatial parameters. For example, the device 300 may ensure that each codeword is associated with a bounded range of VCSELs emitting for each distribution of light. If the device 300 identifies any codewords are associated with a number of VCSELs outside the bounded range emitting for a distribution, the device 300 may adjust the distributions of light based on the identified codewords. In some implementations, the feedback for previous distributions may also indicate if a spatial parameter was not met. If a spatial parameter was not met for previous distributions of light, the device 300 may adjust the generated distributions of light based on the spatial parameter not being previously met (such as adjusting X1 or Y1 for a first distribution or adjusting X2 or Y2 for a second distribution). If no adjustments are to be made based on one or more spatial parameters (such as the device 300 determining that the current distributions of light should meet the one or more spatial parameters and determining that the previous distributions of light met the one or more spatial parameters), configuring the distributions at 1106 may include not adjusting the distributions of light generated at 1104 (such as preserving the previously generated distributions). For example, the device 300 may not adjust X1 and Y1 for a first distribution and not adjust X2 and Y2 for a second distribution in configuring the distributions based on spatial parameters at 1106.

At 1108, the device 300 may configure the generated distributions of light based on one or more parameters of the array. Similar to above for 1106, configuring at 1108 may include adjusting the distributions based on whether one or more parameters of the array are met for the previous distributions (such as indicated by the feedback). Configuring at 1108 may also include adjusting the distributions based on the one or more parameters of the array not being met for the current distributions. Configuring at 1108 may also include not adjusting the current distributions of light (such as preserving the generated distributions at 1104 or the adjusted distributions at 1106) if the device 300 determines from the feedback and the one or more parameters 1102 that the one or more parameters of the array are to be met for the distributions as currently generated.

At 1110, the device 300 may also configure the generated distributions of light based on one or more time parameters. Similar to above for 1106 and 1108, configuring at 1110 may include adjusting the distributions based on whether one or more time parameters are met for the previous distributions (such as indicated by the feedback). Configuring at 1110 may also include adjusting the distributions based on the one or more time parameters not being met for the current distributions. Configuring at 1110 may also include not adjusting the current distributions of light (such as preserving the generated distributions at 1104 or adjusted distributions at 1106 or 1108) if the device 300 determines from the feedback and the one or more parameters 1102 that the one or more time parameters are to be met for the distributions as currently generated. At 1112, the device 300 determines whether the one or more parameters 1102 are met by the current distributions. As used herein, the one or more parameters 1102 being met may be referred to as the distributions passing, and the one or more parameters 1102 not being met may be referred to as the distributions failing. 1112 may be similar to decision block 1012 in FIG. 10. If the distributions of light pass, the distributions of light may be considered a candidate for the final distributions of light 1116 for active depth sensing.

In some other implementations of 1112, determining whether the distributions of light pass or fail includes determining whether the active depth sensing system performs better using the current distributions of light or the previous distributions of light. For example, a depth map of a scene and corresponding to the current distributions of light may be compared to a depth map of the scene and corresponding to the previous distributions of light. The current distributions of light may pass if the corresponding depth map is identified as the better depth map. For example, a depth map may be better if the depth map includes a fewer number of invalid depth values. In another example, a depth map may be better if the depth map is a higher resolution with less than a threshold number of invalid depth values. If the current distributions of light pass, a depth map for the next distributions of light may be compared to the depth map for the current distributions of light at 1112. If the current distributions of light fail, the depth map for the next distributions of light may be compared to the depth map for the previous distributions of light.

At 1114, the device 300 generates feedback based on the generated distributions of light after configuration at 1110. For example, at 1104, the device 300 may determine (X1, Y1,t1) and (X2,Y2,t2) as the distributions of light. After configuration at 1110, the adjusted distributions of light may be (X1',Y1',t1') and (X2',Y2',t2'). The generated feedback may include the variables (X1',Y1',t1') and (X2',Y2',t2').

In some implementations, the device 300 may code a sequence of variables as the feedback. For example, the device 300 may code a sequence indicating [X1',Y1',t1',X2', Y2',t2']. The coded sequence may also indicate whether the distributions of light passed or failed, whether any adjustments were made after being generated (such as a difference between [X1,Y1,t1,X2,Y2,t2] and [X1',Y1',t1',X2',Y2',t2']), which distribution parameters caused the distributions to fail, or any other suitable information.

As noted above, generating and adjusting the distributions of light may be conceptualized as a multiple dimension problem. For example, adjusting X1 or Y1 may affect t1, t2, X2, Y2, or Z. Similarly, adjusting a different variable may affect other variables. Therefore, the variables are configured in a space including the spatial dimensions, time dimension, and array dimension, with each dimension related to the other dimensions (such as a 4d space). As such, configuring the distributions of light at 1106-1110 may be performed concurrently, sequentially, or in any suitable order based on the relationships between the dimensions to determine the variables (X1,Y1,t1) and (X2,Y2,t2) for the final distributions of light. The final distributions of light may then be used for active depth sensing, such as described above with reference to FIGS. 4-9.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 306 in the example device 300 of FIG. 3) comprising instructions 308 that, when executed by the processor 304 (or the controller 310 or the image signal processor 312), cause the device 300 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 304 or the image signal processor 312 in the example device 300 of FIG. 3. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the described example operations, if performed by the device 300, the controller 310, the processor 304, and/or the image signal processor 312, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. An apparatus for active depth sensing, comprising:
a projector that includes an array of light sources and is configured to:
emit, using a first set of light sources from the array of light sources of the projector, a first distribution of light during a first time, wherein the first distribution of light includes a first set of light points arranged according to at least a first pattern; and
emit, using a second set of light sources from the array of light sources of the projector, a second distribution of light during a second time, wherein the second distribution of light is an inverse of the first distribution of light and includes a second set of light points arranged according to at least a second pattern that is different from the first pattern;
an image sensor configured to:
receive one or more reflections of the first distribution of light during capture of a first frame associated with the first time; and
receive one or more reflections of the second distribution of light during capture of a second frame associated with the second time; and
an image signal processor configured to:
generate a first set of depth values based on the first frame and the first pattern;
generate a second set of depth values based on the second frame and the second pattern; and
combine the first set of depth values and the second set of depth values to generate a set of depth values for a depth map, the set of depth values being associated with one or more objects in a scene.

2. The apparatus of claim 1, wherein the projector is further configured to emit a third distribution of light different from the first distribution of light and the second distribution of light during a third time, wherein the set of depth values of the one or more objects in the scene is further based on one or more reflections of the third distribution of light.

3. The apparatus of claim 1, wherein each light source of the array of light sources is configured to emit light during one or more of the first time or the second time.

4. The apparatus of claim 1, wherein:
the projector is configured to periodically alternate between emitting the first distribution of light and emitting the second distribution of light, wherein:
each emission of the first distribution of light is associated with capture of one of a first set of frames by the image sensor; and
each emission of the second distribution of light is associated with capture of one of a second set of frames by the image sensor; and
the image signal processor is configured to:
generate the first set of depth values based on the first set of frames; and
generate the second set of depth values based on the second set of frames.

5. The apparatus of claim 1, wherein:
the first set of depth values is included in a first depth map;
the second set of depth values is included in a second depth map, wherein a first position in the first depth map of a first depth value from the first set of depth values corresponds to a second position in the second depth map of a second depth value from the second set of depth values; and
to generate the set of depth values for the depth map, the image signal processor is configured to:
determine whether the first depth value is a valid depth value;
determine whether the second depth value is a valid depth value; and based on only one of the first depth value or the second depth value being determined to be a valid depth value, setting a depth value of the set of depth values as the valid depth value.

6. The apparatus of claim 5, wherein, to generate the set of depth values, the image signal processor is configured to, based on both of the first depth value and the second depth value being determined to be a valid depth value, set the depth value as one of:
the first depth value;
the second depth value; or
an average of the first depth value and the second depth value.

7. The apparatus of claim 1, further comprising:
a processor configured to provide instructions to the image signal processor for execution;
a memory configured to store the set of depth values; and
a display configured to display a final depth map based on the set of depth values.

8. The apparatus of claim 1, wherein the projector is configured to alternate between emitting the first distribution of light and emitting the second distribution of light, wherein:
the first distribution of light is a primal distribution of light;
the second distribution of light is a dual distribution of light; and
the dual distribution of light is an inverse of the primal distribution of light to permit complementary decoding of a same portion of frame captures of an image sensor to patterns from the primal distribution of light and from the dual distribution of light.

9. The apparatus of claim 1, wherein the first distribution of light and the second distribution of light are determined in one or more spatial dimensions, a time dimension, and an array dimension based on one or more dimension parameters.

10. The apparatus of claim 1, further comprising an image signal processor configured to generate the set of depth values for the depth map at least in part by:
determining whether a first depth value in a first depth map is a valid depth value;
determining whether a second depth value in a second depth map is a valid depth value, wherein a first position in the first depth map of the first depth value corresponds to a second position in the second depth map of the second depth value; and
based on whether one or both of the first depth value or the second depth value being determined to be a valid depth value, setting a depth value of the set of depth values.

11. The apparatus of claim 10, wherein, to generate the set of depth values for the depth map, the image signal processor is configured to, based on both of the first depth value and the second depth value being determined to be a valid depth value, set the depth value as one of:
the first depth value;
the second depth value; or
an average of the first depth value and the second depth value.

12. A method for active depth sensing, comprising:
emitting, using a first set of light sources from an array of light sources of a projector, a first distribution of light during a first time, wherein the first distribution of light includes a first set of light points arranged according to at least a first pattern;
emitting, using a second set of light sources from the array of light sources of the projector, a second distribution of light during a second time, wherein the second distribution of light is an inverse of the first distribution of light and includes a second set of light points arranged according to at least a second pattern that is different from the first pattern;
receiving, by an image sensor, one or more reflections of the first distribution of light during capture of a first frame associated with the first time;
receiving, by the image sensor, one or more reflections of the second distribution of light during capture of a second frame associated with the second time;
generating, by an image signal processor, a first set of depth values based on the first frame and the first pattern;
generating, by the image signal processor, a second set of depth values based on the second frame and the second pattern; and
combining the first set of depth values and the second set of depth values to generate a set of depth values for a depth map, the set of depth values being associated with one or more objects in a scene.

13. The method of claim 12, further comprising emitting, by the projector, a third distribution of light different from the first distribution of light and the second distribution of light during a third time, wherein the set of depth values of the one or more objects in the scene is further based on one or more reflections of the third distribution of light.

14. The method of claim 12, further comprising:
emitting, by each light source of the array of light sources, light during one or more of the first time or the second time.

15. The method of claim 12, further comprising:
periodically alternating between emitting the first distribution of light and emitting the second distribution of light, wherein:
each emission of the first distribution of light is associated with capture of one of a first set of frames by the image sensor; and
each emission of the second distribution of light is associated with capture of one of a second set of frames by the image sensor;
generating the first set of depth values based on the first set of frames; and
generating the second set of depth values based on the second set of frames.

16. The method of claim 12, wherein:
the first set of depth values is included in a first depth map;
the second set of depth values is included in a second depth map, wherein a first position in the first depth map of a first depth value from the first set of depth values corresponds to a second position in the second depth map of a second depth value from the second set of depth values; and
generating the set of depth values for the depth map includes:
determining whether the first depth value is a valid depth value;
determining whether the second depth value is a valid depth value; and
based on only one of the first depth value or the second depth value being determined to be a valid depth value, setting a depth value of the set of depth values as the valid depth value.

17. The method of claim 16, wherein generating the set of depth values further includes, based on both of the first depth value and the second depth value being determined to be a valid depth value, setting the depth value as one of:
the first depth value;
the second depth value; or
an average of the first depth value and the second depth value.

18. The method of claim 12, wherein the projector is configured to alternate between emitting the first distribution of light and emitting the second distribution of light, and wherein:
the first distribution of light is a primal distribution of light;
the second distribution of light is a dual distribution of light; and
the dual distribution of light is an inverse of the primal distribution of light to permit complementary decoding of a same portion of frame captures of an image sensor to patterns from the primal distribution of light and from the dual distribution of light.

19. The method of claim 12, wherein the first distribution of light and the second distribution of light are determined in one or more spatial dimensions, a time dimension, and an array dimension based on one or more dimension parameters.

20. The method of claim 12, further comprising generating the set of depth values for the depth map at least in part by:
determining whether a first depth value in a first depth map is a valid depth value;
determining whether a second depth value in a second depth map is a valid depth value, wherein a first position in the first depth map of the first depth value corresponds to a second position in the second depth map of the second depth value; and
based on whether one or both of the first depth value or the second depth value being determined to be a valid depth value, setting a depth value of the set of depth values.

21. The method of claim 20, wherein generating the set of depth values for the depth map includes, based on both of the first depth value and the second depth value being determined to be a valid depth value, setting the depth value as one of:
the first depth value;
the second depth value; or
an average of the first depth value and the second depth value.

22. A non-transitory, computer-readable medium storing instructions that, when executed by one or more processors of a device performing active depth sensing, cause the device to:
emit, using a first set of light sources from an array of light sources of a projector, a first distribution of light during a first time, wherein the first distribution of light includes a first set of light points arranged according to at least a first pattern;
emit, using a second set of light sources from the array of light sources of the projector, a second distribution of light during a second time, wherein the second distribution of light is an inverse of the first distribution of light and includes a second set of light points arranged according to at least a second pattern that is different from the first pattern;
receive, using an image sensor, one or more reflections of the first distribution of light during capture of a first frame associated with the first time;
receive, using the image sensor, one or more reflections of the second distribution of light during capture of a second frame associated with the second time;
generate, using an image signal processor, a first set of depth values based on the first frame and the first pattern;
generate, using the image signal processor, a second set of depth values based on the second frame and the second pattern; and
combine the first set of depth values and the second set of depth values to generate a set of depth values for a depth map, the set of depth values being associated with one or more objects in a scene.

23. The computer-readable medium of claim 22, wherein execution of the instructions further causes the device to:
emit, by the projector, a third distribution of light different from the first distribution of light and the second distribution of light during a third time, wherein the set of depth values of the one or more objects in the scene is further based on one or more reflections of the third distribution of light.

24. The computer-readable medium of claim 22, wherein execution of the instructions further causes the device to:
periodically alternate between emitting the first distribution of light and emitting the second distribution of light, wherein:
each emission of the first distribution of light is associated with capture of one of a first set of frames by the image sensor; and
each emission of the second distribution of light is associated with capture of one of a second set of frames by the image sensor;
generate the first set of depth values based on the first set of frames; and
generate the second set of depth values based on the second set of frames.

25. The computer-readable medium of claim 22, wherein:
the first set of depth values is included in a first depth map;
the second set of depth values is included in a second depth map, wherein a first position in the first depth map of a first depth value from the first set of depth values corresponds to a second position in the second depth map of a second depth value from the second set of depth values; and
generating the set of depth values for the depth map includes:
determining whether the first depth value is a valid depth value;
determining whether the second depth value is a valid depth value; and
based on only one of the first depth value or the second depth value being determined to be a valid depth value, setting a depth value of the set of depth values as the valid depth value.

26. The computer-readable medium of claim 22, wherein execution of the instructions further causes the device to alternate, by the projector, between emitting the first distribution of light and emitting the second distribution of light, wherein:
the first distribution of light is a primal distribution of light;
the second distribution of light is a dual distribution of light; and
the dual distribution of light is an inverse of the primal distribution of light to permit complementary decoding of a same portion of frame captures of an image sensor to patterns from the primal distribution of light and from the dual distribution of light.

27. The computer-readable medium of claim 22, wherein the first distribution of light and the second distribution of light are determined in one or more spatial dimensions, a time dimension, and an array dimension based on one or more dimension parameters.

28. The computer-readable medium of claim 22, wherein execution of the instructions further causes the device to:
  emit, by each light source of the array of light sources, light during one or more of the first time or the second time.

\* \* \* \* \*